United States Patent
Araki

(10) Patent No.: US 7,354,965 B2
(45) Date of Patent: Apr. 8, 2008

(54) AZO COMPOUND, COLORANT-CONTAINING CURABLE COMPOSITION, AND COLOR FILTER AND METHOD OF PRODUCING THE SAME

(75) Inventor: Katsumi Araki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 733 days.

(21) Appl. No.: 10/941,910

(22) Filed: Sep. 16, 2004

(65) Prior Publication Data
US 2005/0065246 A1    Mar. 24, 2005

(30) Foreign Application Priority Data
Sep. 18, 2003 (JP) .............. 2003-325961
Nov. 17, 2003 (JP) .............. 2003-386541
Mar. 4, 2004 (JP) .............. 2004-060988
Mar. 12, 2004 (JP) .............. 2004-071307

(51) Int. Cl.
C08K 5/3445 (2006.01)
G03C 1/52 (2006.01)

(52) U.S. Cl. ............ 524/106; 252/183.11; 252/183.13; 252/586; 359/241; 428/1.1; 430/7; 430/157; 430/164; 430/270.1; 548/314.7; 548/321.5

(58) Field of Classification Search ............... 524/106; 252/183.11, 183.13, 586; 359/241; 428/1.1; 430/7, 157, 164, 270.1; 548/314.7, 321.5
See application file for complete search history.

(56) References Cited

U.S. PATENT DOCUMENTS

| 4,330,468 A | 5/1982 | Brierley et al. |
| 5,691,098 A * | 11/1997 | Busman et al. ............. 430/158 |

FOREIGN PATENT DOCUMENTS

| DE | 27 14 204 A1 | 10/1977 |
| EP | 0 564 168 A2 | 10/1993 |
| FR | 2 303 839 | 10/1976 |
| GB | 1 537 365 | 12/1978 |
| JP | 58-152240 A | 9/1983 |
| JP | 2-199403 A | 8/1990 |
| JP | 4-76062 A | 3/1992 |
| JP | 5-273411 A | 10/1993 |
| JP | 6-184482 A | 7/1994 |
| JP | 7-140654 A | 6/1995 |
| JP | 2002-278056 A | 9/2002 |
| PL | 101484 | 3/1979 |

* cited by examiner

*Primary Examiner*—Kriellion A Sanders
(74) *Attorney, Agent, or Firm*—Sughrue Mion, PLLC

(57) ABSTRACT

The present invention provides a novel azo compound, a curable composition comprising a colorant superior in the light-fastness and heat resistance of a dye, pattern-forming characteristics (developing characteristics) and liquid preserving characteristics, a color filter using the curable composition and a method of producing the color filter.

20 Claims, No Drawings

AZO COMPOUND, COLORANT-CONTAINING CURABLE COMPOSITION, AND COLOR FILTER AND METHOD OF PRODUCING THE SAME

CROSS-REFERENCE TO RELATED APPLICATION

This application claims priority under 35 USC 119 from Japanese Patent Applications No.2003-325961, No.2003-386541, No.2004-60988 and No.2004-71307 the disclosure of which are incorporated by reference herein.

BACKGROUND OF THE INVENTION

1. Field of the Invention

The present invention relates to a novel azo dye compound, and a colorant-containing curable composition for color filter use which is preferable to form a color image of color filters used for liquid crystal displays and solid imaging devices (e.g., CCD and CMOS), and a color filter and a method of producing the color filter.

2. Description of the Related Art

It has been desired to develop a compound having high fastness in both light fastness and heat resistance in the fields of dyes and earnest studies have been made to develop such a compound. Particularly, in the fields of dyes soluble in a solvent or water, the development of compounds superior in both light fastness and heat resistance has been desired.

As dyes superior in both light fastness and heat resistance, for Synthesis Example, Cr complexes of phthalocyanine type compounds and azo type dyes are known. However, the phthalocyanine type dyes are unfit for absorption in the visible wavelength range from 400 to 500 nm and are therefore not useful as yellow or magenta dyes. Also, the phthalocyanine type compounds exhibit high light fastness due to their molecular associations and therefore have a problem concerning preserving stability: specifically, for example, dyes precipitate depending on the dissolution state of these phthalocyanine type compounds.

Also, it has been pointed out that the Cr complex of an azo type dye contains a Cr atom and is therefore harmful to humans and environments. It has been desired to improve the drawback of the Cr complex. On the other hand, the azo type dye is a useful dye which has a high chromatic value and can possess various absorption wavelengths. However, none of non-metallic complex types satisfying requirements for light fastness and heat resistance at the same time has been found yet.

As azo type dyes having relatively high light fastness among these azo type dyes, compounds (e.g., Acid Red 57) having a γacid as a coupling component and compounds (e.g., Acid Yellow 29) having pyrazolone as a coupling agent have been known for a long time. However, no compound also satisfying requirements for heat resistance at the same time has been found so far (see, for example, Patent References 1 to 4.

There is also the problem that the heat resistance and light fastness of these dyes are significantly reduced depending on working conditions. For example, one or both of the heat resistance and the light fastness are reduced depending on the type of fiber to be dyed or in the following cases: in the case where these dyes coexist with other dye compounds, a photoinitiator, a polymerizable compound and an oxidant/a reducing agent, in the case where these dyes are present under an environment permitting ozone to generate and in the case where these dyes are present under an environment permitting a singlet oxygen to generate.

Further, many dyes exhibiting high light fastness and heat resistance are decreased in solubility in water or a solvent, giving rise to a problem concerning industrial applicability.

In the meantime, a dying method, printing method, electrodeposition method and pigment dispersion method are known as a method of producing color filters used for liquid crystal displays and solid imaging devices.

The pigment dispersion method among these methods is a method of producing a color filter using a color radiation-sensitive composition prepared by dispersing a pigment in various light-sensitive compositions by a photolithographic method and has the merit that this composition is stable to light, heat and the like because it uses a pigment. Also, since a photolithographic method is used to carry out patterning, the positional accuracy of the patterning is high and therefore, this pigment dispersion method has been widely used as a preferable method to produce a color filter for a color display having a large image plane and high precision.

When a color filter is manufactured by the above pigment dispersion method, the radiation-sensitive composition is applied to a glass substrate by a spin coater or roll coater and dried to form a coating layer, which is then exposed patternwise to light and developed to form color pixels. This operation may be carried out every color to obtain a color filter.

As a specific example of the composition used in the above pigment dispersion method, negative type light-sensitive compositions using an alkali-soluble resin, a photopolymerizable monomer and a photoinitiator have been used (see, for example, Patent References 5 to 9).

In the meantime, it has been desired in recent years to develop a more precise color filter in applications such as solid imaging devices. However, in a conventional pigment dispersion system, it is difficult to more improve resolution and also, the conventional system has, for example, the problem that coarse particles of a pigment causes color unevenness. This is the reason why the pigment dispersion method is not suitable to applications, such as, solid imaging devices, for which fine patterns are required.

Instances using dyes soluble in solvents or water to solve the above problems have been known (see, for example, Patent Reference 10).

However, curable compositions containing a dye have new problems such as those described in the following (1) to (4). Specifically;

(1) it is difficult to obtain a liquid curable composition having a desired spectrum because dyes are usually less soluble in either an aqueous alkali solution or an organic solvent;

(2) it is difficult to control each solubility (developing characteristics) of a cured portion and uncured portion because many dyes interact with other components contained in a curable composition;

(3) a large amount of a dye must be added in the case where the molar extinction coefficient ($\epsilon$) of the dye is low and it is therefore inevitable to decrease other components such as a polymerizable compound (monomer), a binder and a photoinitiator, giving rise to the problem that the curability of the composition, heat resistance after curing and the developing characteristics of a (non) cured portion are deteriorated; and (4) dyes are usually inferior in light fastness and heat resistance to pigments.

In the case of an application to a color filter for solid imaging device unlike the case of an application to a semiconductor, the layer thickness of the curable composition must be 1.5 μm or less. It is therefore necessary to add a large amount of dyes in the curable composition, posing the same problem that is mentioned above.

The above problem makes it difficult to satisfy the practical requirements as to a fine and thin layer color pattern for a highly precise color filter.

For this, it has been desired to develop dyes and curable compositions which can solve the above problem.

Patent References:

[Patent Reference 1] P.L. Patent Invention No. 101484,
[Patent Reference 2] D.T. Patent No. 2714204,
[Patent Reference 3] FR No. 2303839,
[Patent Reference 4] Japanese Patent Application Laid-Open (JP-A) No. 58-152240).
[Patent Reference 5] Japanese Patent Application Laid-Open (JP-A) No. 2-199403
[Patent Reference 6] JP-A No. 4-76062
[Patent Reference 7] JP-A No. 5-273411
[Patent Reference 8] JP-A No. 6-184482
[Patent Reference 9] JP-A No. 7-140654
[Patent Reference 10] JP-A No. 2002-278056

SUMMARY OF THE INVENTION

The present invention has been made in view of the above various problems and has the object of providing an azo compound which has high heat resistance and light fastness and is highly soluble in water or an organic solvent.

Another object of the invention is to provide a colorant-containing curable composition superior in the molar extinction coefficient and chromatic value of a dye, light fastness, heat resistance and pattern forming characteristics (developing characteristics), and a color filter and a method of producing the color filter.

According to the invention, a compound having a specific structure having the following aminopyrazole skeleton and a sulfonamide group at the same time and a colorant-containing curable composition for color filter use containing the compound are provided.

According to a first aspect of the invention, there is provided an azo compound represented by the following formula (I):

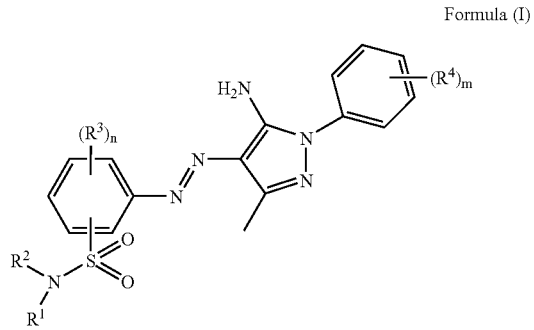

Formula (I)

wherein $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms and $R^1$ and $R^2$ may form a hetero ring with nitrogen atoms bonded therewith; $R^3$ represents a halogen atom, a trihalomethyl group, an alkoxy group having 1 to 21 carbon atoms or a nitro group; $R^4$ represents a halogen atom or a —$SO_3M$ group; M represents a metal atom cation or a cation comprising a nitrogen-containing compound; m denotes an integer from 0 to 5; and n denotes an integer from 0 to 4.

According to the invention, an azo compound which has high heat resistance and light fastness and is also superior in solubility in water or an organic solvent can be provided.

According to a second aspect of the invention, there is provided a colorant-containing curable composition comprising a colorant, wherein the colorant contains a compound represented by the formula (I).

According to a third aspect of the invention, there is provided a positive type colorant-containing curable composition comprising a compound represented by the above formula (I), a photosensitizer and a solvent.

According to a fourth aspect of the invention, there is provided a positive type colorant-containing curable composition comprising a compound represented by the above formula (I), a photo-acid generating agent and a hardener.

According to a fifth object of the invention, there is provided a color filter comprising a compound represented by the formula (I).

According to a sixth aspect of the invention, there is provided a method of producing a color filter, the method comprising applying the above colorant-containing curable composition to a support, then exposing the composition to light through a mask and developing the composition to form a pattern.

This production method may comprise a step of curing the pattern by heating and/or exposure according to the need and may be a method in which these steps are repeated plurally.

According to the invention, an azo compound having high heat resistance and light fastness and high solubility in water or an organic solvent, a colorant-containing curable composition superior in the heat resistance, light fastness and molar extinction coefficient (chromatic value) of the colorant and pattern-forming characteristics, a color filter and a simple and high cost performance method of producing a color filter can be provided.

DETAILED DESCRIPTION OF THE INVENTION

An azo compound, a colorant-containing curable composition, a color filter and a method of producing the color filter will be hereinafter explained in detail.

<<Colorant-containing Curable Composition>>

The colorant-containing curable composition (hereinafter called "the composition of the invention" if necessary) is a colorant-containing curable composition containing a colorant, wherein the colorant contains a compound (azo compound of the invention) represented by the following formula (I)).

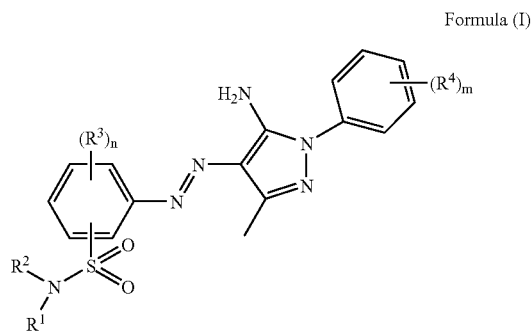

Formula (I)

wherein $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms and $R^1$ and $R^2$ may form a hetero ring with nitrogen atoms bonded therewith; $R^3$ represents a halogen atom, a trihalomethyl group, an alkoxy group having 1 to 21 carbon atoms or a nitro group; $R^4$ represents a halogen atom or a —$SO_3M$ group; M represents a metal atom cation or a cation comprising a nitrogen-containing compound; m denotes an integer from 0 to 5; and n denotes an integer from 0 to 4.

The composition of the invention contains the compound (azo compound of the invention) represented by the above formula (I) and can hence exhibit high performance as to the heat resistance, light fastness and molar extinction coefficient (chromatic value) of the colorant.

Also, the composition of the invention is improved particularly in chromatic value, allowing the amount of the dye to be decreased. This makes it possible to increase the content of other additives, with the result that various performances of a resist can be improved. Moreover, the composition of the invention can improve the developing characteristics and residual film rate of an exposed portion and an unexposed portion and can therefore exhibit good pattern-forming characteristics. Also, the composition of the invention is free from fear of a deterioration in the aforementioned various performances in production processes, ensuring high productivity.

The composition of the invention contains at least a colorant and is usually used together with a solvent. Also, the composition of the invention may contain a binder, a polymerizable compound (monomer), a photoinitiator, a crosslinking agent, photosensitizer and a photo-acid generating agent according to the need.

Specifically, when the composition of the invention is a negative type composition, it may contain, besides the above colorant, a solvent, a polymerizable compound (monomer), a binder (preferably an alkali-soluble binder), a photoinitiator and further a crosslinking agent.

Also, when the composition of the invention is a positive type composition, it contains, besides the above colorant, an organic solvent, or a hardener, a photosensitizer or photoacid generating agent.

The invention can provide a colorant-containing curable composition which has high sensitivity, high resolution, high heat resistance and wide developing latitude, is resistant to the elution of the dye, is superior in the solvent-resistance of a pattern and has high productivity, a color filter using this composition and a method of producing the color filter.

<Colorant>

The composition of the present invention contains a compound (azo compound of the invention) represented by the above formula (I) as the colorant. The composition of the invention may contain two or more types of the compound represented by the formula (I). The colorant (dye compound) in the invention will be explained in detail.

-Azo Compound of the Invention-

The azo compound represented by the above formula (I) is a novel compound which satisfies higher light fastness and higher heat resistance at the same time as compared with azo compounds currently used and can be freely dissolved in water or a solvent if necessary.

In the above formula (I), $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms. Also, $R^1$ and $R^2$ may form a hetero ring in combination with a nitrogen atom connected therewith.

In the formula (I), $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms.

The alkyl group having 1 to 21 carbon atoms and represented by $R^1$ or $R^2$ may be substituted or may have a substituent, is preferably an alkyl group having 1 to 15 carbon atoms and more preferably an alkyl group having 1 to 10 carbon atoms.

The alkyl group having 1 to 21 carbon atoms and represented by $R^1$ or $R^2$ may be any of straight-chain, branched and cyclic alkyl groups. Preferable examples of the alkyl group include a methyl group, ethyl group, n-propyl group, n-butyl group, n-amyl group, n-hexyl group, n-heptyl group, n-octyl group, n-nonyl group, n-decyl group, n-undecyl group, n-dodecyl group, n-tridecyl group, n-tetradecyl group, n-pentadeyl group, n-hexadecyl group, n-heptadecyl group, n-octadecyl group, n-nonadecyl group, n-eicosanyl group, i-propyl group, sec-butyl group, i-butyl group, t-butyl group, 1-methylbutyl group, 1-ethylpropyl group, 2-methylbutyl group, i-amyl group, neopentyl group, 1,2-dimethylpropyl group, 1,1-dimethylpropyl group, t-amyl group, 1,3-dimethylbutyl group, 3,3-dimethylbutyl group;

2-ethylbutyl group, 2-ethyl-2-methylpropyl group, straight-chain or branched heptyl group, 1-methylheptyl group, 2-ethylhexyl group, 1,5-dimethylhexyl group, t-octyl group, branched nonyl group, branched decyl group, branched undecyl group, branched dodecyl group, branched tridecyl group, branched tetradecyl group, branched pentadecyl group, branched hexadecyl group, branched heptadecyl group, branched octadecyl group, straight-chain or branched nonadecyl group, straight-chain or branched eicosanyl group, cyclopropyl group, cyclopropylmethyl group, cyclobutyl group, cyclobutylmethyl group, cyclopentyl group, cyclohexyl group, cyclohexylmethyl group, cycloheptyl group, cyclooctyl group, cyclohexylpropyl group, cyclododecyl group, norbornyl group, bornyl group, cis-myrtanyl group, isopinocamphenyl group, noradamantyl group, adamantyl group, adamantylmethyl group, 1-(1-adamantyl)ethyl group, 3,5-dimethyladamantyl group, quinuclidinyl group, cyclopentylethyl group and bicyclooctyl group.

Among the above groups, a methyl group, ethyl group, n-propyl group, n-butyl group, n-amyl group, n-hexyl group, n-heptyl group, n-octyl group, n-nonyl group, n-decyl group, n-undecyl group, n-dodecyl group, n-tridecyl group, n-tetradecyl group, i-propyl group, sec-butyl group, i-butyl group, t-butyl group, 1-methylbutyl group, 1-ethylpropyl group, 2-methylbutyl group, i-amyl group, neopentyl group, 1,2-dimethylpropyl group, 1,1-dimethylpropyl group, t-amyl group, 1,3-dimethylbutyl group, 3,3-dimethylbutyl group, 2-ethylbutyl group, 2-ethyl-2-methylpropyl group, straight-chain or branched heptyl group, 1-methylheptyl group, 2-ethylhexyl group, 1,5-dimethylhexyl group, t-octyl group, branched nonyl group, branched decyl group, branched undecyl group, branched dodecyl group, branched tridecyl group, branched tetradecyl group, cyclopropyl group, cyclopropylmethyl group, cyclobutyl group, cyclobutylmethyl group, cyclopentyl group, cyclohexyl group, cyclohexylmethyl group, cycloheptyl group, cyclooctyl group, cyclohexylpropyl group, cyclododecyl group, norbornyl group, bornyl group, cis-myrtanyl group, isopinocamphenyl group, noradamantyl group, adamantyl group, adamantylmethyl group, 1-(1-adamantyl)ethyl group, 3,5-dimethyladamantyl group, quinuclidinyl group, cyclopentylethyl group and bicyclooctyl group are more preferable.

Among the above groups, a methyl group, ethyl group, n-propyl group, n-butyl group, n-amyl group, n-hexyl group, n-heptyl group, n-octyl group, n-nonyl group, n-decyl group, i-propyl group, sec-butyl group, i-butyl group, t-butyl group, 1-methylbutyl group, 1-ethylpropyl group, 2-methylbutyl group, i-amyl group, neopentyl group, 1,2-dimethylpropyl group, 1,1-dimethylpropyl group, t-amyl group, 1,3-dimethylbutyl group, 3,3-dimethylbutyl group, 2-ethylbutyl group, 2-ethyl-2-methylpropyl group, straight-chain or branched heptyl group, 1-methylheptyl group, 2-ethylhexyl group, 1,5-dimethylhexyl group, t-octyl group, branched nonyl group, branched decyl group, cyclopropyl group, cyclopropylmethyl group, cyclobutyl group, cyclobutylmethyl group, cyclopentyl group, cyclohexyl group, cyclohexylmethyl group, cycloheptyl group, cyclooctyl group, cyclohexylpropyl group, cyclododecyl group, norbornyl group, bornyl group, noradamantyl group, adamantyl group, adamantylmethyl group, 1-(1-adamantyl)ethyl group, 3,5-dimethyladamantyl group, cyclopentylethyl group and bicyclooctyl group are particularly preferable.

Among the above groups, an ethyl group, n-propyl group, n-butyl group, n-amyl group, n-hexyl group, n-heptyl group, n-octyl group, n-nonyl group, n-decyl group, i-propyl group, sec-butyl group, i-butyl group, t-butyl group, 1-methylbutyl group, 1-ethylpropyl group, 2-methylbutyl group, i-amyl group, neopentyl group, 1,2-dimethylpropyl group, 1,1-dimethylpropyl group, t-amyl group, 1,3-dimethylbutyl group, 3,3-dimethylbutyl group, 2-ethylbutyl group, 2-ethyl-2-methylpropyl group, branched heptyl group, 1-methylheptyl group, 1,5-dimethylhexyl group, t-octyl group, branched nonyl group, branched decyl group, cyclopropyl group, cyclopropylmethyl group, cyclobutyl group, cyclobutylmethyl group, cyclopentyl group, cyclohexyl group, cyclohexylmethyl group, cycloheptyl group, cyclooctyl group, cyclohexylpropyl group, cyclododecyl group, norbornyl group, bornyl group, noradamantyl group, adamantyl group, adamantylmethyl group, 1-(1-adamantyl)ethyl group, 3,5-dimethyladamantyl group, cyclopentylethyl group and bicyclooctyl group are particularly preferable from the viewpoint of improving heat resistance.

Among the alkyl groups exemplified above, particularly alkyl groups substituted with fluorine are preferable. As the alkyl groups substituted with fluorine, a trifluoromethyl group, trifluoroethyl group, pentafluoroethyl group, heptafluoropropyl group, nonafluorobutyl group, tridecafluorohexyl group, pentadecafluoroheptyl group, heptadecafluorooctyl group, tridecafluorooctyl group, nonadecafluorononyl group, heptadecafluorodecyl group and perfluorodecyl group are preferable. Among these groups, a trifluoromethyl group, pentafluoroethyl group, heptafluoropropyl group, nonaflurobutyl group, tridecafluorohexyl group and pentadecafluoroheptyl group are more preferable and a trifluoromethyl group, pentafluoroethyl group, heptafluoropropyl group, nonaflurobutyl group and tridecafluorohexyl group are particularly preferable.

The alkenyl group having 2 to 21 carbon atoms and represented by $R^1$ or $R^2$ may be unsubstituted or may have a substituent, is preferably an alkenyl group having 2 to 15 carbon atoms and is more preferably an alkenyl group having 2 to 10 carbon atoms.

Preferable examples of the alkenyl group having 2 to 21 carbon atoms and represented by $R^1$ or $R^2$ include a vinyl group, isopropenyl group, 2-propenyl group, 2-methyl-propenyl group, 1-methyl-1-propenyl group, 1-butenyl group, 3-butenyl group, 1-methyl-1-butenyl group, 1,1-dimethyl-3-butenyl group, 1-pentenyl group, 2-pentenyl group, 1-ethyl-1-pentenyl group, 1-hexenyl group, 1-heptenyl group, 2,6-dimethyl-5-heptenyl group, 9-decenyl group, 1-cyclopentenyl group, 2-cyclopentenylmethyl group, cyclohexenyl group, 1-methyl-2-cyclohexenyl group, 1,4-dihydro-2-methylphenyl group, octenyl group, citronellyl group, oleyl group, geranyl group, farnesyl group and 2-(1-cyclohexenyl)ethyl group.

Among these groups, a vinyl group, isopropenyl group, 2-propenyl group, 2-methyl-propenyl group, 1-methyl-1-propenyl group, 1-butenyl group, 3-butenyl group, 1-methyl-1-butenyl group, 1,1-dimethyl-3-butenyl group, 1-pentenyl group, 2-pentenyl group, 1-ethyl-1-pentenyl group, 1-hexenyl group, 1-heptenyl group, 1-cyclopentenyl group, 2-cyclopentenylmethyl group, cyclohexenyl group, 1-methyl-2-cyclohexenyl group and 1,4-dihydro-2-methylphenyl group are more preferable and a vinyl group, isopropenyl group, 2-propenyl group, 2-methyl-propenyl group, 1-methyl-1-propenyl group, 1-butenyl group, 3-butenyl group, 1-methyl-1-butenyl group, 1,1-dimethyl-3-butenyl group, 1-pentenyl group, 2-pentenyl group, 1-ethyl-1-pentenyl group, 1-hexenyl group, 1-cyclopentenyl group, 2-cyclopentenylmethyl group, cyclohexenyl group, 1-methyl-2-cyclohexenyl group and 1,4-dihydro-2-methylphenyl group are particularly preferable.

The aryl group having 6 to 21 carbon atoms and represented by $R^1$ or $R^2$ may be unsubstituted or may have a substituent, is preferably an aryl group having 6 to 15 carbon atoms and is more preferably an aryl group having 6 to 10 carbon atoms.

Preferable examples of the aryl group having 6 to 21 carbon atoms and represented by $R^1$ or $R^2$ include a phenyl group, naphthyl group, biphenylenyl group, acenaphthenyl group, fluorenyl group, anthracenyl group, anthraquinonyl group and pyrenyl group. Among these groups, a phenyl group, naphthyl group, biphenylenyl group, acenaphthenyl group, fluorenyl group and anthracenyl group are more preferable and a phenyl group, naphthyl group, biphenylenyl group and fluorenyl group are particularly preferable.

The aralkyl group having 7 to 21 carbon atoms and represented by $R^1$ or $R^2$ may be unsubstituted or may have a substituent, is preferably an aralkyl group having 7 to 15 carbon atoms and is more preferably an aralkyl group having 7 to 10 carbon atoms.

Preferable examples of the aralkyl group having 7 to 21 carbon atoms and represented by $R^1$ or $R^2$ include a benzyl group, diphenylmethyl group, 1,2-diphenylethyl group, phenyl-cyclopentylmethyl group, α-methylbenzyl group, phenylethyl group, α-methyl-phenylethyl group, β-methyl-phenylethyl group, 3-phenylpropyl group, 3,3-diphenylpropyl group, 4-phenylbutyl group, naphthylmethyl group, styryl group, cinnamyl group, fluorenyl group, 1-benzocyclobutenyl group, 1,2,3,4-tetrahydronaphthyl group, indanyl group, piperonyl group and pyrenemethyl group.

Among these groups, a benzyl group, phenyl-cyclopentylmethyl group, α-methylbenzyl group, phenylethyl group, α-methyl-phenylethyl group, β-methyl-phenylethyl group, 3-phenylpropyl group, 4-phenylbutyl group, styryl group, cinnamyl group, fluorenyl group, 1-benzocyclobutenyl group and 1,2,3,4-tetrahydronaphthyl group are more preferable and a benzyl group, α-methylbenzyl group, phenylethyl group, α-methyl-phenylethyl group, β-methyl-phenylethyl group, 3-phenylpropyl group, styryl group, cinnamyl group, fluorenyl group, 1-benzocyclobutenyl group and 1,2,3,4-tetrahydronaphthyl group are particularly preferable.

The group represented by $R^1$ or $R^2$ may contain an ether group and a tetrahydrofurfuryl group, 2,5-dihydro-2,5-dimethoxyfurfuryl group and the like are preferable.

$R^1$ and $R^2$ may form a hetero ring in combination with a nitrogen atom combined therewith. As the hetero ring in this case, a 2-methylaziridine ring, azetidine ring, pyrrolidine ring, 3-pyrroline ring, piperidine ring, 1,2,3,6-tetrahydropyridine ring, hexamethyleneimine ring, piperazine ring, 1,3,3-trimethyl-6-azabicyclo[3.2.1]octane ring, decahydroquinoline ring, oxazolidine ring, morpholine ring, thiazolidine ring, thiomorpholine ring, indoline ring, isoindoline ring, 1,2,3,4-tetrahydrocarbazole ring, 1,2,3,4-tetrahydroquinoline ring, 1,2,3,4-tetrahydroisoquinoline ring, iminodibenzyl ring, phenoxazine ring, phenothiazine ring and phenazine ring are preferable.

Among these groups, a pyrrolidine ring, 3-pyrroline ring, piperidine ring, 1,2,3,6-tetrahydropyridine ring, hexamethyleneimine ring, piperazine ring, decahydroquinoline ring, oxazolidine ring, morpholine ring, thiazolidine ring and thiomorpholine ring are more preferable and a pyrrolidine ring, 3-pyrroline ring, piperidine ring, 1,2,3,6-tetrahydropyridine ring, piperazine ring, decahydroquinoline ring, oxazolidine ring, morpholine ring, thiazolidine ring and thiomorpholine ring are particularly preferable.

The group represented by $R^1$ or $R^2$ may contain an ether group and are also respectively preferably a tetrahydrofurfuryl group, tetrahydropyranylmethyl group, 2,5-dihydro-2,5-dimethoxyfurfuryl group or the like.

Examples of the substituent for the alkyl group, alkenyl group, aryl group, aralkyl group and the substituent for the hetero ring formed by $R^1$ and $R^2$ together with a substituted nitrogen atom include preferably an acyl group, acylamino group, acylaminocarbonylamino group, aralkylaminocarbonylamino group, arylaminocarbonylamino group, methacryloylaminocarbonylamino group, trifluoromethyl group, fluoro group, chloro group, bromo group, iodo group, hydroxy group, nitro group, methyl group, ethyl group, n-propyl group, i-propyl group, n-butyl group, i-butyl group, sec-butyl group, t-butyl group, pentyl group, hexyl group, heptyl group, octyl group, vinyl group, methoxy group, ethoxy group, butoxy group, isopropoxy group, t-butoxy group, cyclohexyloxy group, vinyloxy group, methylthio group, ethylthio group, pyrrolidinyl group, piperidinyl group, amino group, dimethylamino group, diethylamino group, phenyl group or —SO$_3$M' group (M' represents a hydrogen atom or a metal atom such as Na, Ca, Mg, K and Sr).

Among these groups, an acyl group (especially an acetyl group), acylamino group, trifluoromethyl group, fluoro group, chloro group, bromo group, hydroxy group, nitro group, methyl group, ethyl group, n-propyl group, i-propyl group, n-butyl group, i-butyl group, sec-butyl group, t-butyl group, pentyl group, hexyl group, vinyl group, methoxy group, ethoxy group, butoxy group, isopropoxy group, t-butoxy group, cyclohexyloxy group, vinyloxy group, methylthio group, ethylthio group, pyrrolidinyl group, piperidinyl group, amino group, dimethylamino group, diethylamino group, phenyl group or —SO$_3$M' group (M' represents a hydrogen atom or a metal atom such as Na, Ca, Mg, K and Sr) are more preferable. An acyl group (especially an acetyl group), acylamino group, trifluoromethyl group, fluoro group, chloro group, bromo group, hydroxy group, nitro group, methyl group, ethyl group, n-propyl group, i-propyl group, n-butyl group, i-butyl group, t-butyl group, hexyl group, vinyl group, methoxy group, ethoxy group, isopropoxy group, cyclohexyloxy group, vinyloxy group, methylthio group, ethylthio group, pyrrolidinyl group, piperidinyl group, amino group, dimethylamino group, diethylamino group, phenyl group or —SO$_3$M' group (M' represents a hydrogen atom or a metal atom such as Na, Ca, Mg, K and Sr) are particularly preferable.

Also, these substituents may be substituted with the same substituent as above.

Also, in the case where, the substituent of, particularly, $R^1$ and $R^2$ and the above hetero ring is a group having an active hydrogen such as a hydroxy group and an amino group, the substituent may be substituted with a group such as an acetyl group, acyl group, (meth)acryloyl group, alkylaminocarbonyl group, arylaminocarbonyl group (e.g., a butylaminocarbonyl group and phenylaminocarbonyl group), alkyl group, aralkyl group or the like. This can be accomplished by reacting it with various acid chlorides, acid anhydrides, halides or various isocyanates.

The alkyl group, alkenyl group, aryl group and aralkyl group represented by $R^1$ and $R^2$ and the hetero ring formed of $R^1$, $R^2$ and a nitrogen atom may be substituted with each group represented by $R^1$ or $R^2$.

Also, the azo compound may be combined with the same dye structure through the group represented by $R^1$ or $R^2$ to form a bisazo dye, trisazo dye or the like as a whole.

The formula weight of the group represented by $R^1$ and $R^2$ is preferably 500 or less, more preferably 400 or less and particularly preferably 300 or less as the total weight of $R^1$ and $R^2$ from the viewpoint of chromatic value.

The number of the substituents is preferably 0 to 4, more preferably 0 to 3 and particularly preferably 0 to 2.

The aforementioned $R^3$ represents a halogen atom, a trihalomethyl group, an alkoxy group having 1 to 21 carbon atoms or a nitro group. Among groups represented by $R^3$, a fluorine atom, chlorine atom, bromine atom, trifluoromethyl group, alkoxy group having 1 to 15 carbon atoms and nitro group are preferable, a fluorine atom, chlorine atom, trifluoromethyl group, alkoxy group having 1 to 10 carbon atoms and nitro group are more preferable and a chlorine atom, trifluoromethyl group, alkoxy group having 1 to 7 carbon atoms and nitro group are particularly preferable.

Preferable examples of the alkoxy group represented by $R^3$ include alkyloxy groups provided with the alkyl group exemplified as the preferable examples of the alkyl group represented by $R^1$ or $R^2$ as the alkyl part.

The above n denotes an integer from 0 to 4, provided that $R^3$ has no substituent but a —SO$_2$NR$^1$R$^2$ group when n is 0. n is preferably an integer from 0 to 3, more preferably 0 to 2 and particularly preferably 0 or 1.

The above $R^4$ represents a halogen atom or a —SO$_3$M group. Among groups represented by $R^4$, a fluorine atom, chlorine atom, bromine atom and —SO$_3$M group are preferable, a fluorine atom, chlorine atom and —SO$_3$M group are more preferable and a chlorine atom and —SO$_3$M group are particularly preferable.

M in the —SO$_3$M group represents a metal atom cation or a cation constituted of a nitrogen-containing compound. Among metals represented by M, a cation such as Li, Na, K, Rb, Cs, Ag, Mg, Ca, Sr, Ba, Zn, Al, Ni, Cu, Co or Fe or a cation constituted of a nitrogen-containing compound is preferable, a cation such as Na, K, Rb, Cs, Ag, Mg, Ca, Ba, Zn, Al, Cu, Co or Fe or a cation constituted of a nitrogen-containing compound is more preferable and a cation such as Na, K, Rb, Cs, Mg, Ca, Ba, Zn, Al, Cu, Co or Fe or a cation constituted of a nitrogen-containing compound is particularly preferable.

The above m denotes an integer from 0 to 5 and the phenyl group is unsubstituted when n is 0. m is preferably an integer from 0 to 4 and particularly preferably an integer from 0 to 3.

The cation constituted of a nitrogen-containing compound represented by M is selected in consideration of all conditions concerned such as solubility in an organic solvent or water, salt forming ability, absorbance and chromatic value of a dye and heat resistance and light fastness of a colorant. In the case of selecting only from the viewpoint of absorbance and chromatic value, the aforementioned nitrogen-containing compound is preferably a low-molecular weight one. Those having a molecular weight of 300 or less are preferable, those having a molecular weight of 280 or less are more preferable and those having a molecular weight of 250 or less are particularly preferable.

Specific examples of the nitrogen-containing compound in the description reading as follows "cation constituted of the nitrogen-containing compound" will be given below. However, these examples are not intended to be limiting of the invention. The cation here indicates the following nitrogen-containing compounds put in the state of a cation by protonation.

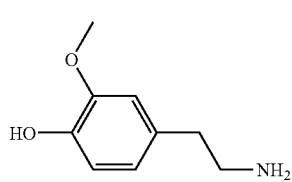
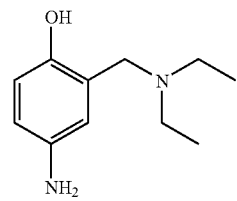
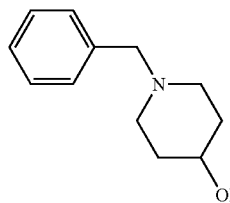
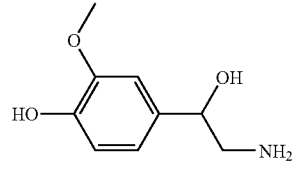
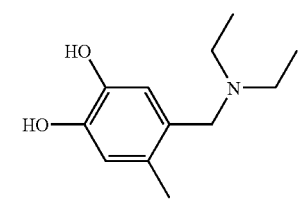
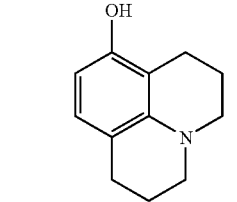
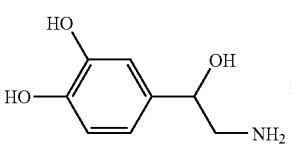
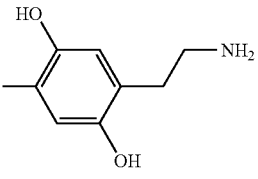
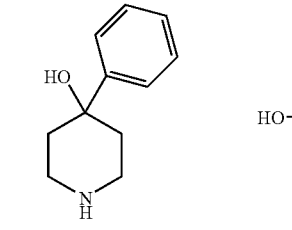
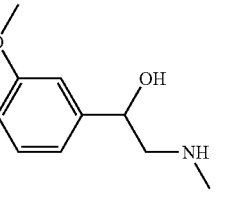

-continued

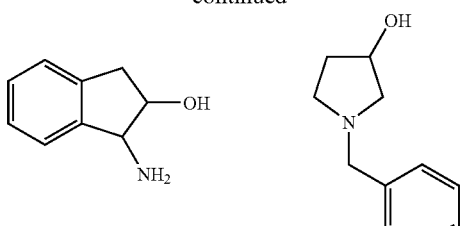
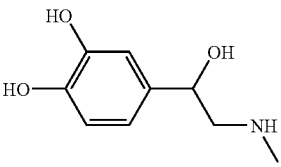
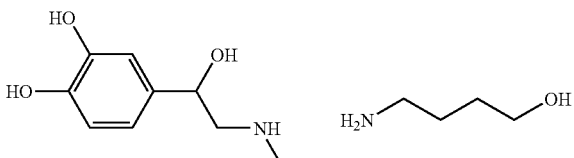
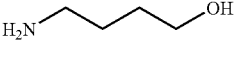
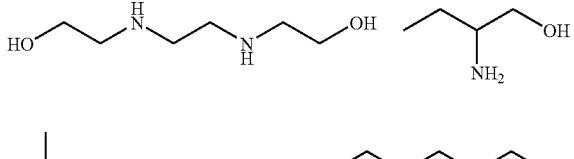
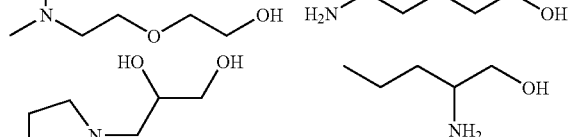
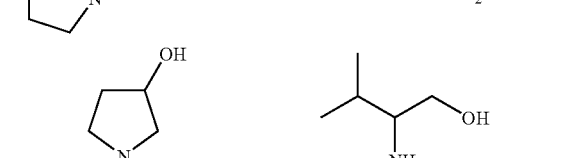
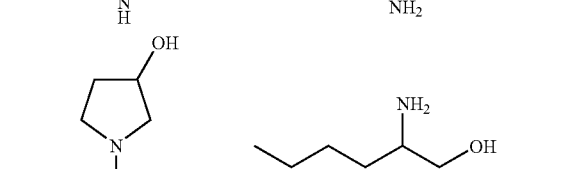
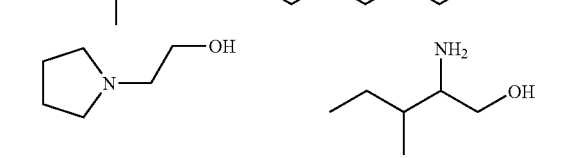
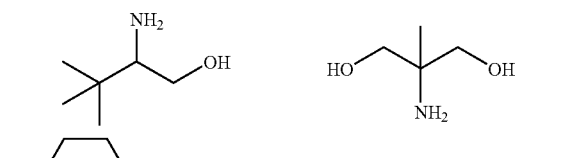
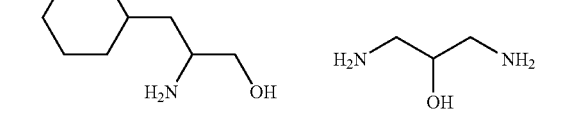

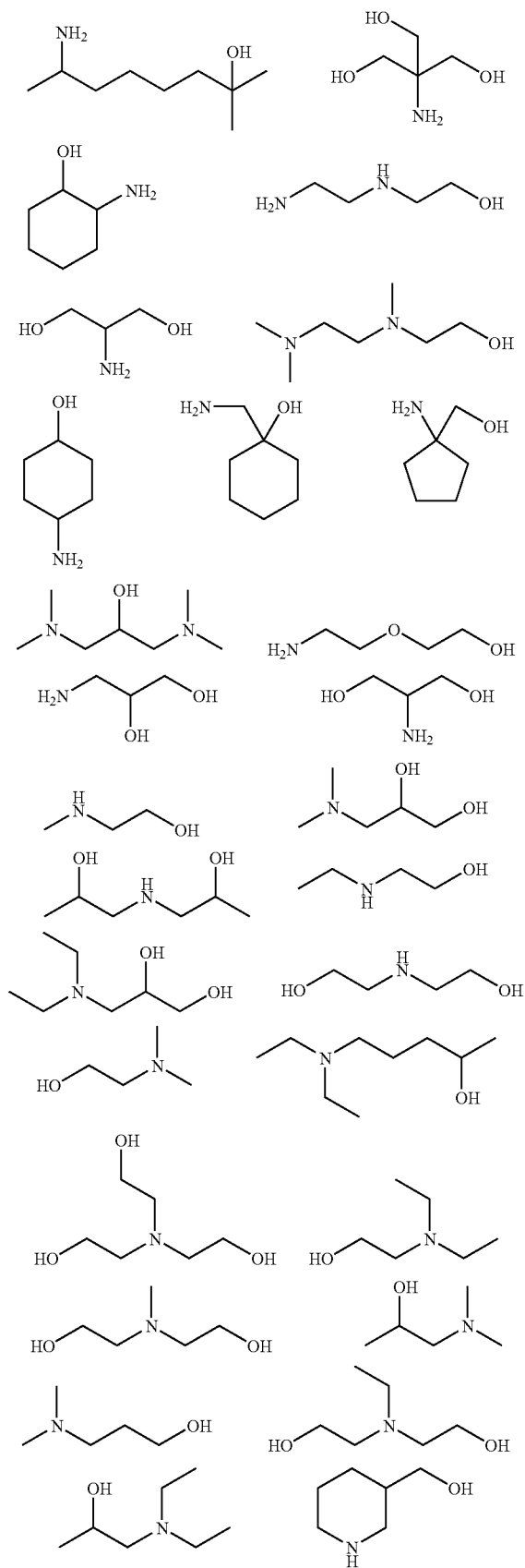
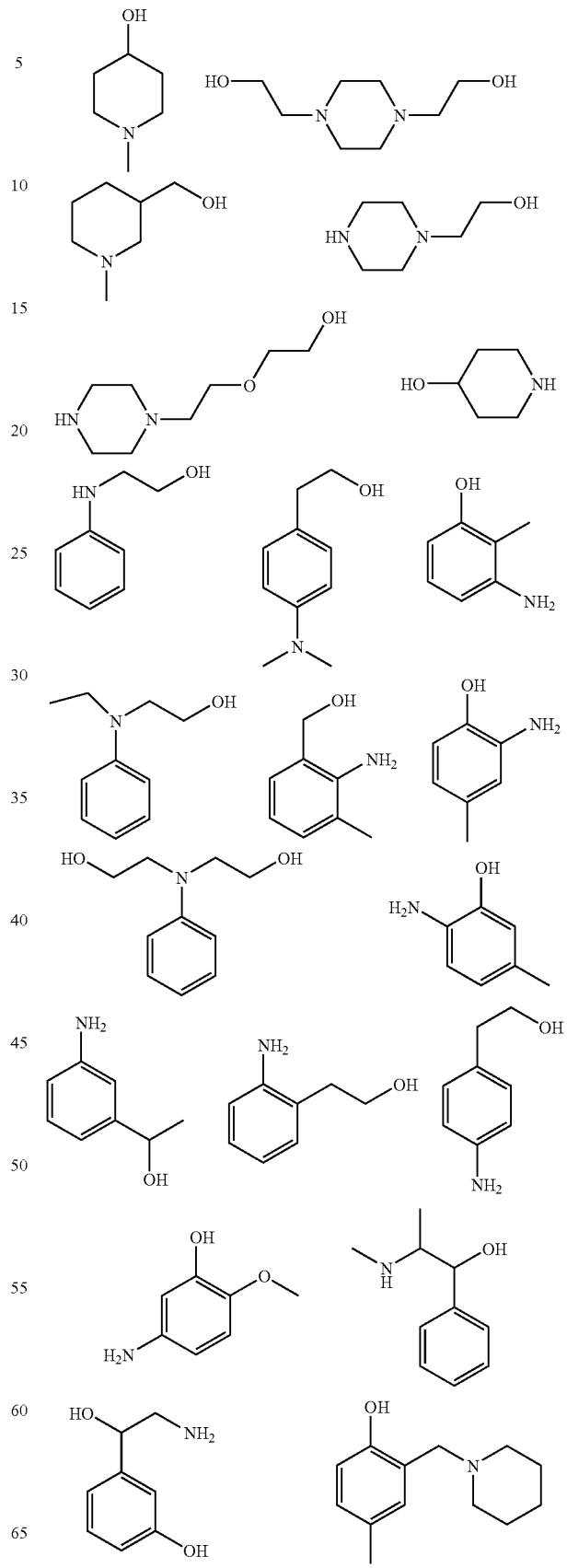

-continued
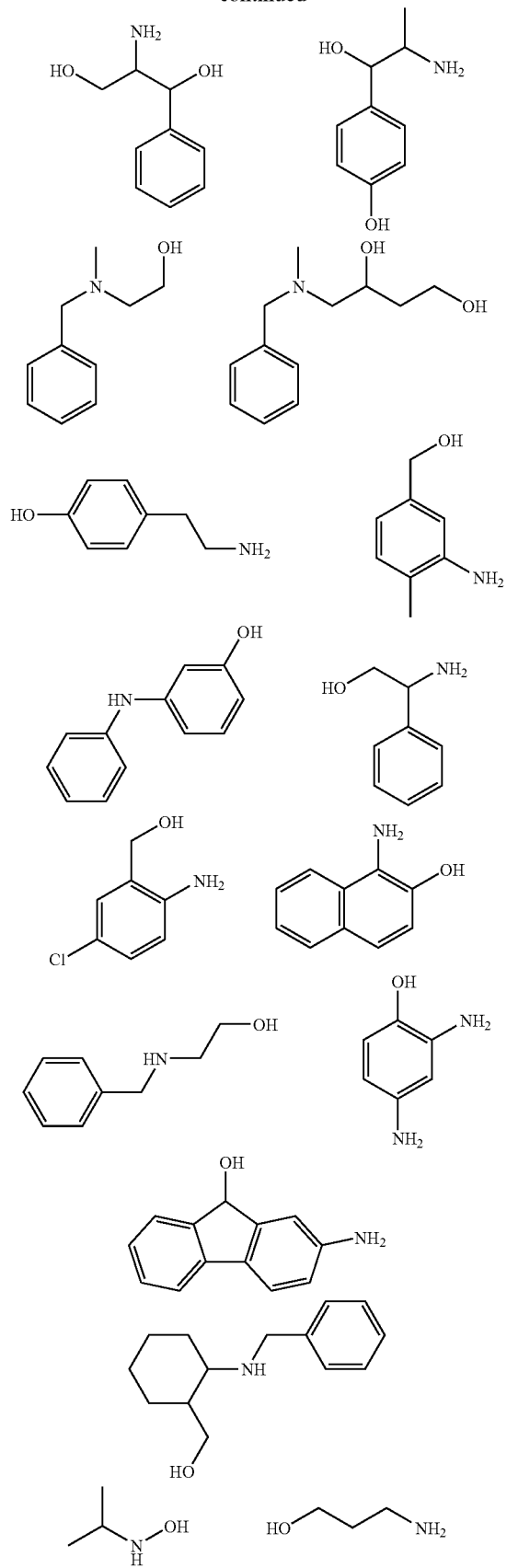
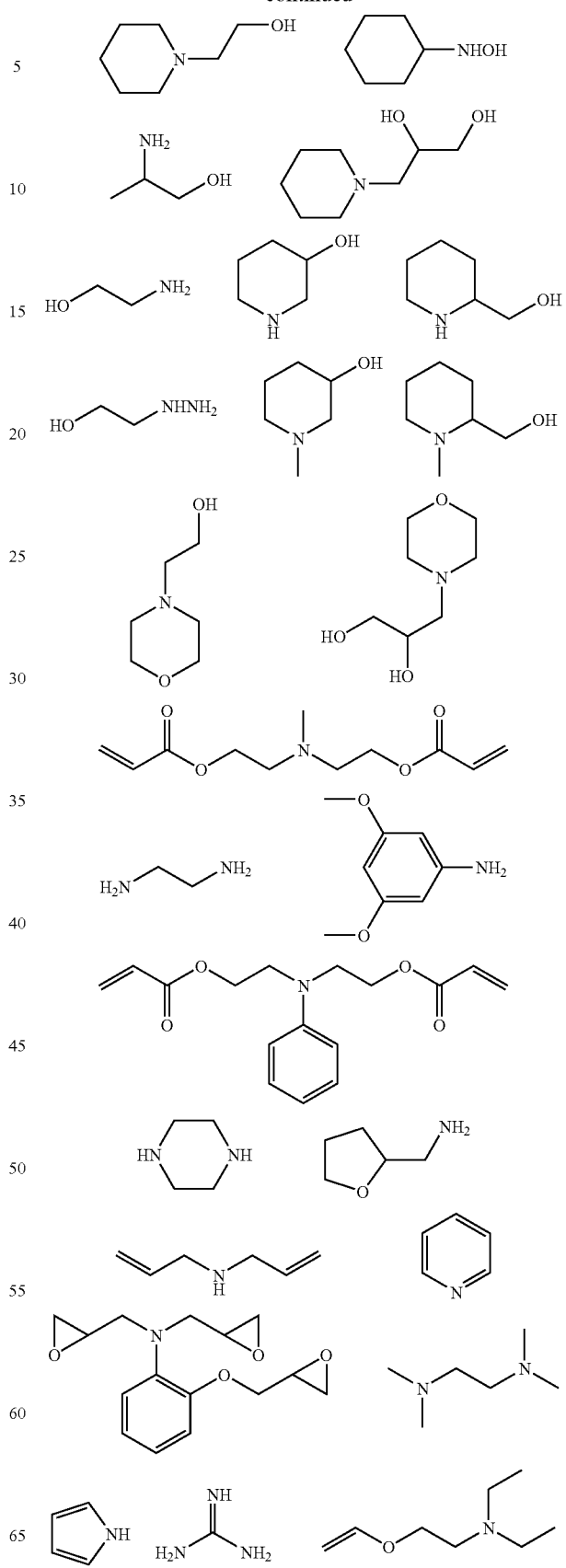

-continued

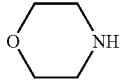 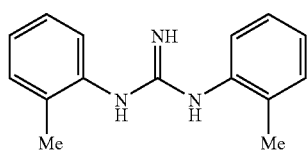

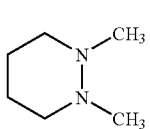 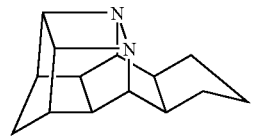

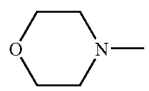 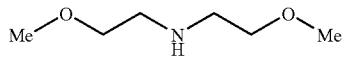

Among the azo compounds represented by the formula (I), azo compounds having the structures represented by the formula (II), (III) or (IV) are preferable from the viewpoint of, for example, light fastness, heat resistance, solubility in water or an organic solvent, molar extinction coefficient and synthetic easiness.

 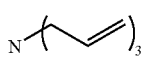 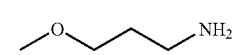

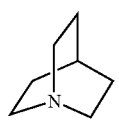 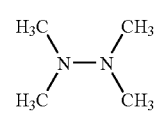 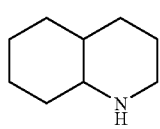

Formula (II)

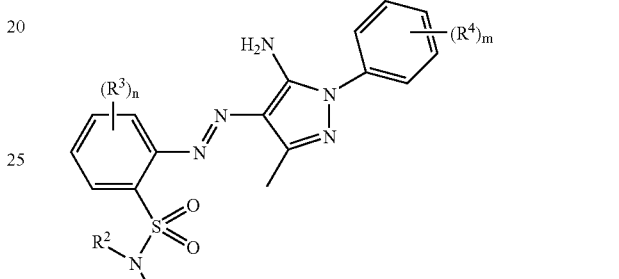

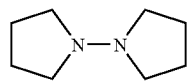 

Formula (III)

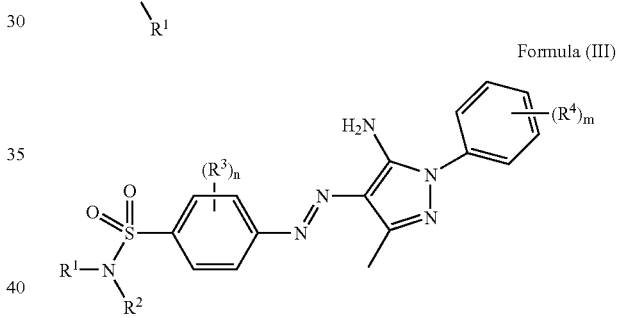

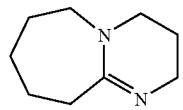 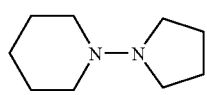

Formula (IV)

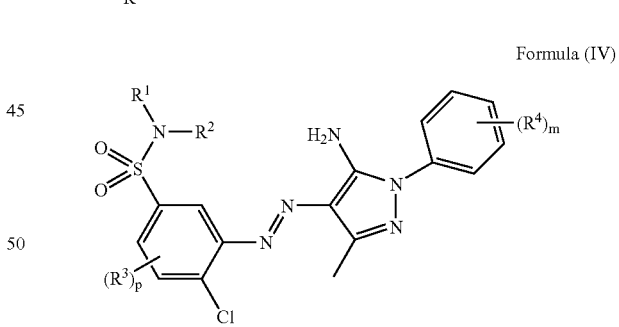

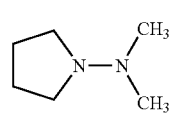 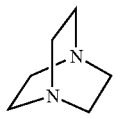

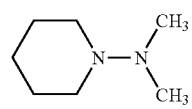 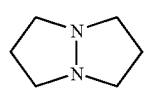

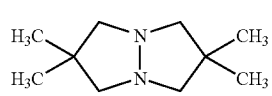 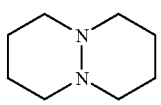

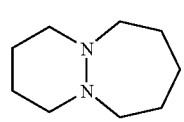 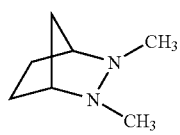

$R^1$, $R^2$, $R^3$, $R^4$ and m in the above formulae (II), (III) and (IV) respectively have the same meaning as $R^1$, $R^2$, $R^3$, $R^4$ and m in the above formula (I). Preferable forms of them are also the same. Also, n in the formulae (II) and (III) has the same meaning as n in the formula (I) and its preferable range is also the same. p in the formula (IV) denotes an integer from 0 to 3, is preferably an integer from 0 to 2 and is particularly preferably an integer of 0 or 1.

Specific examples (exemplified compounds (1) to (34)) of the azo compound represented by the formula (I) will be given below. However, these examples are not intended to be limiting of the invention.

(1)
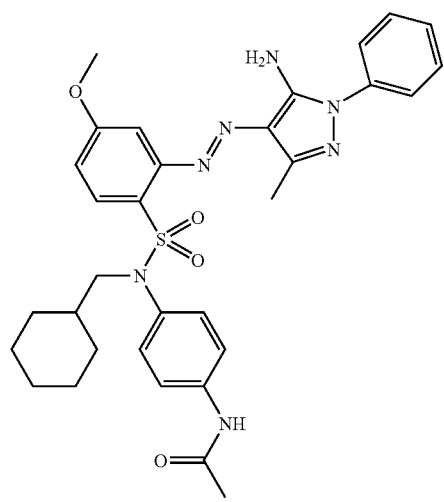
(2)
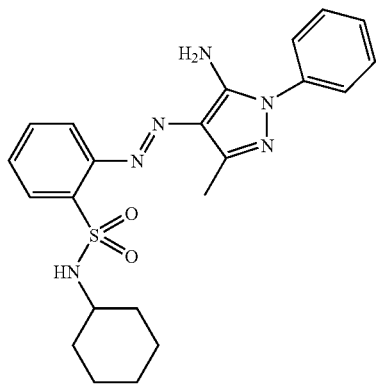
(3)
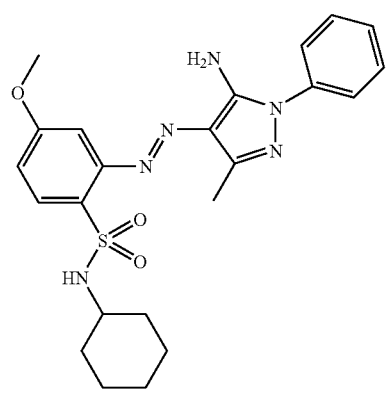
(4)
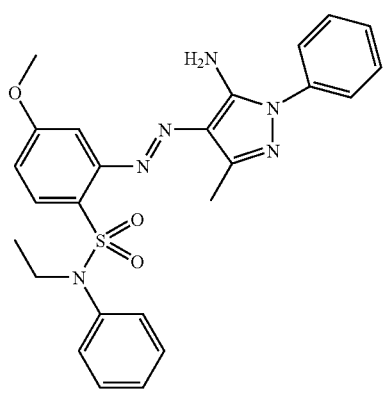
(5)
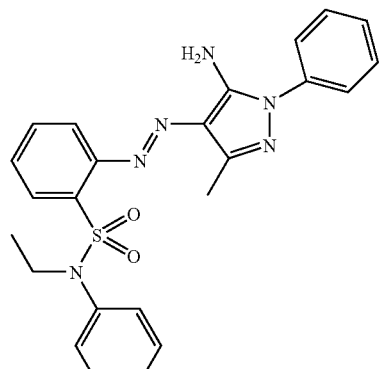
(6)
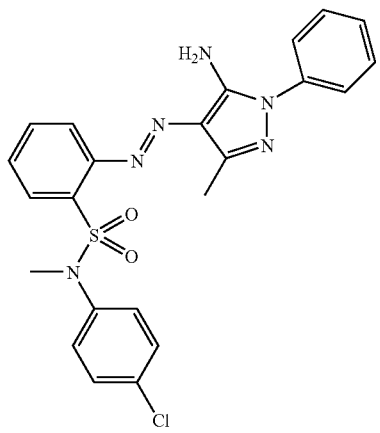

-continued
(7)
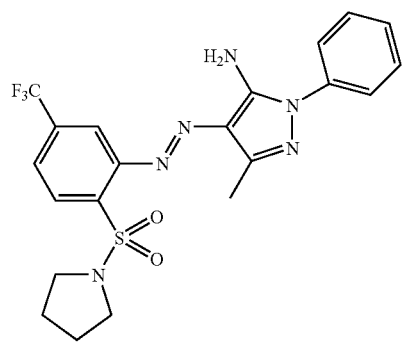
(8)
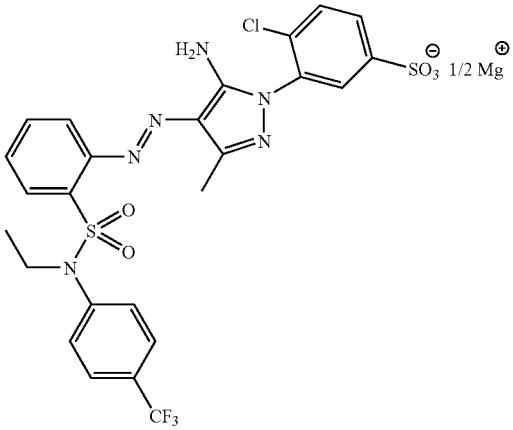
(9)
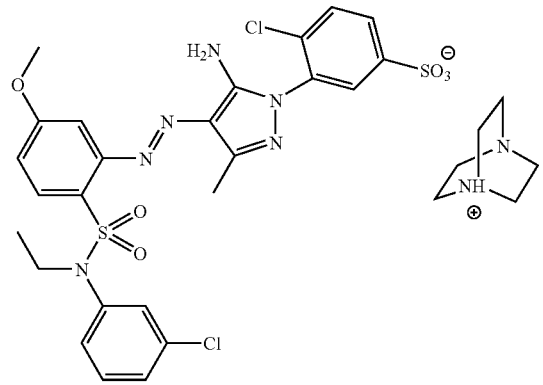
(10)
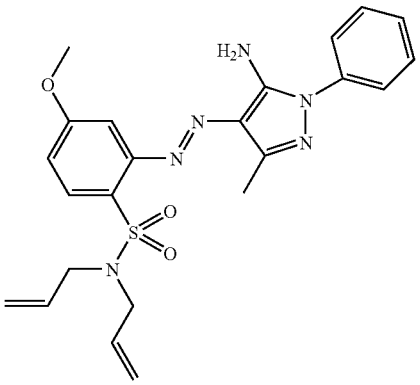
(11)
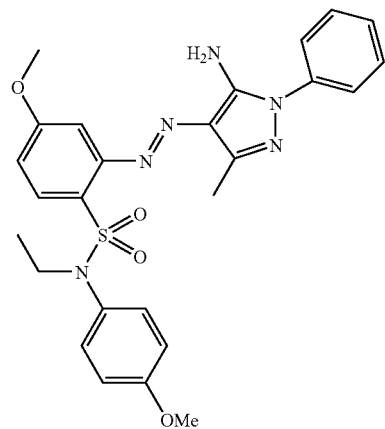
(12)
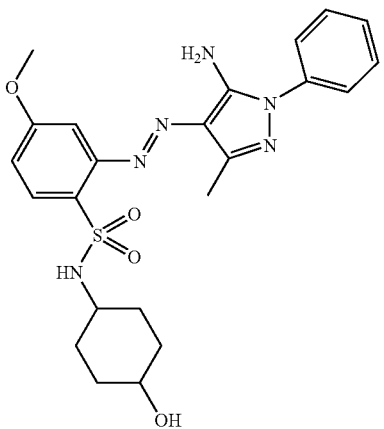
(13)
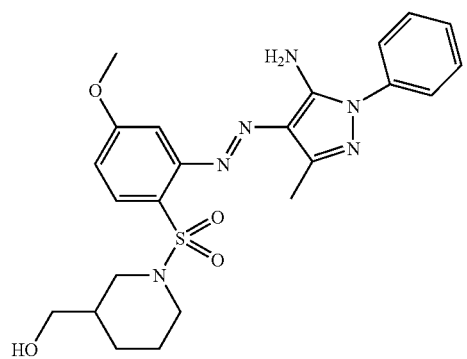
(14)
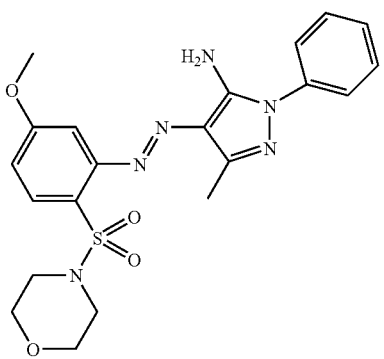

-continued
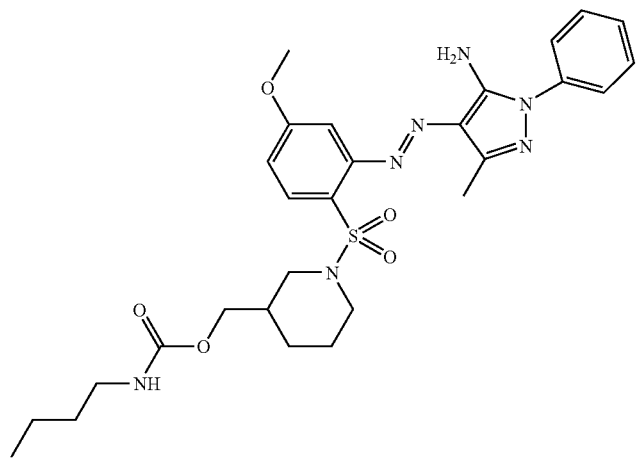
(15)
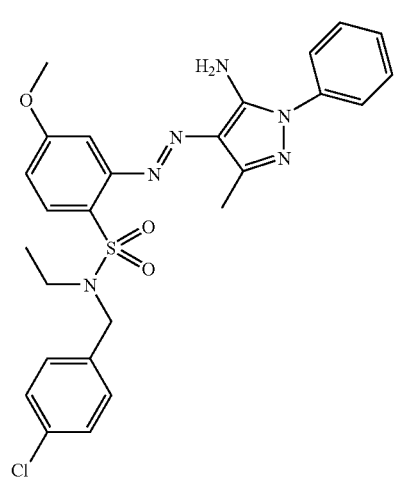
(16)
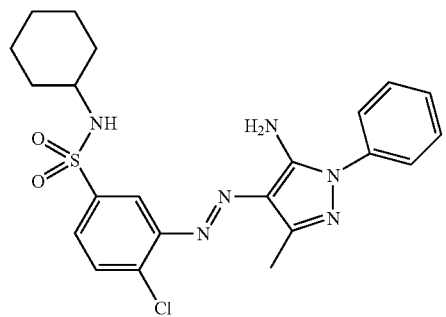
(17)
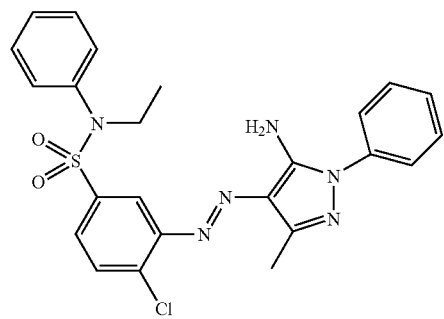
(18)
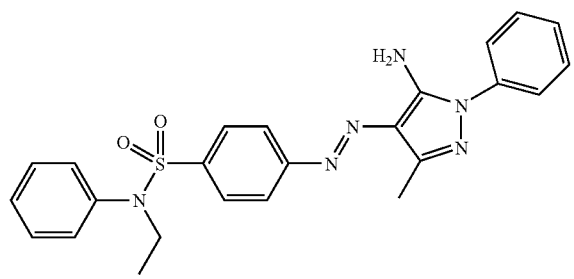
(19)
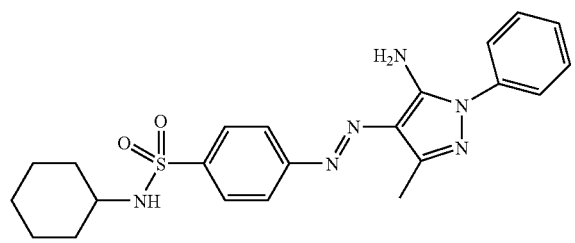
(20)
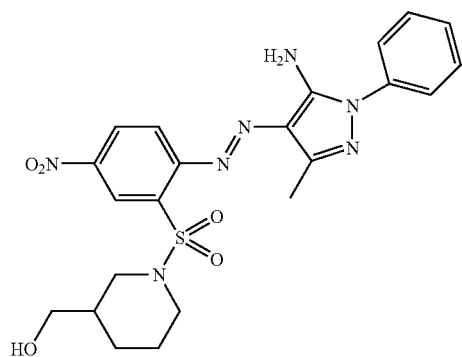
(21)

-continued
(22)
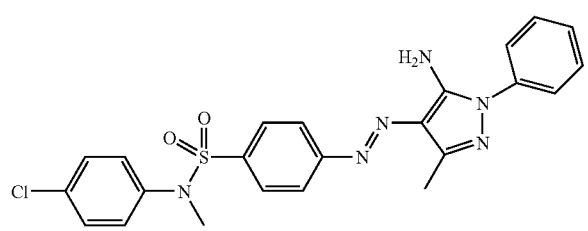
(23)
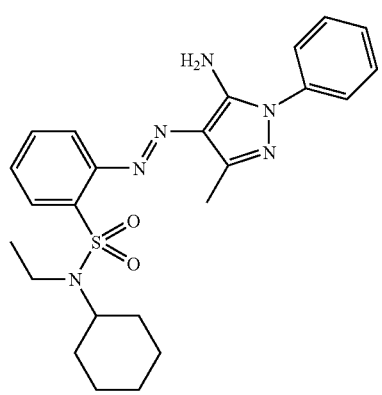
(24)
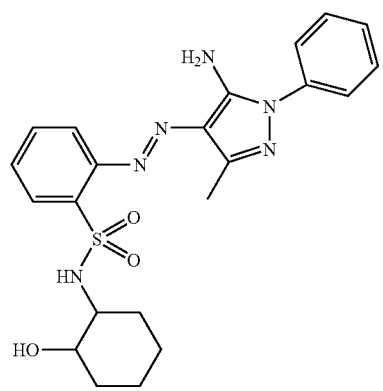
(25)
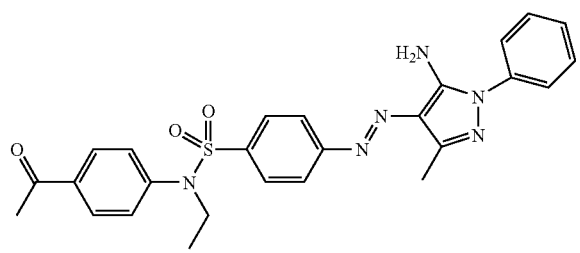
(26)
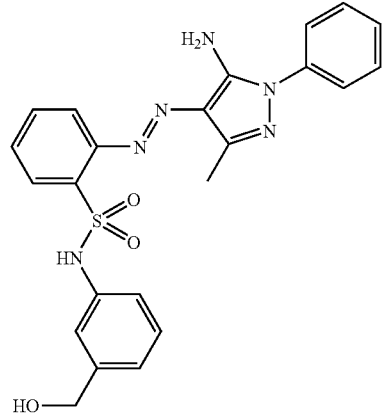
(27)
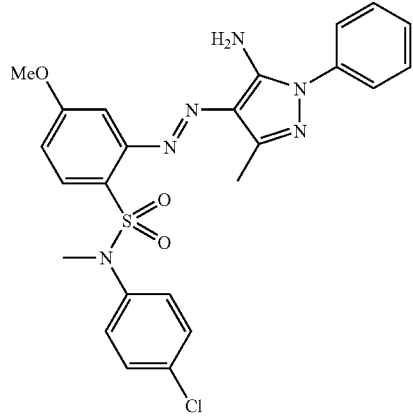

-continued
(28)
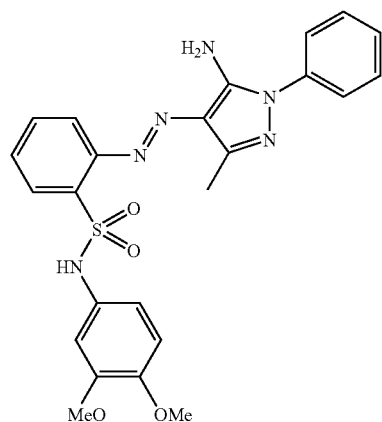
(29)
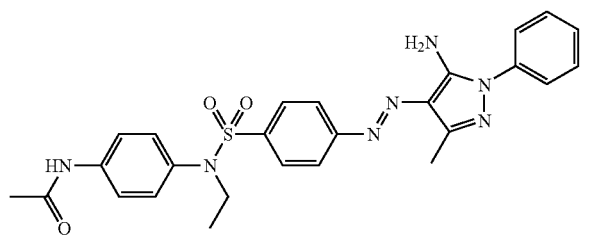
(30)
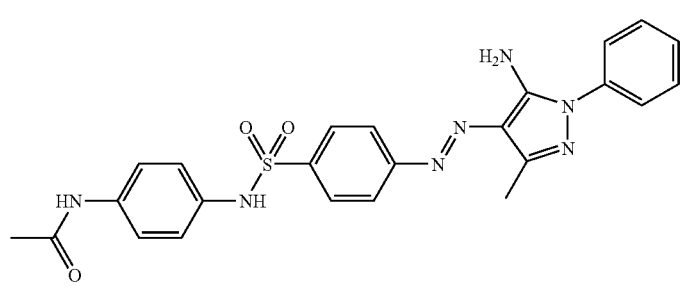
(31)
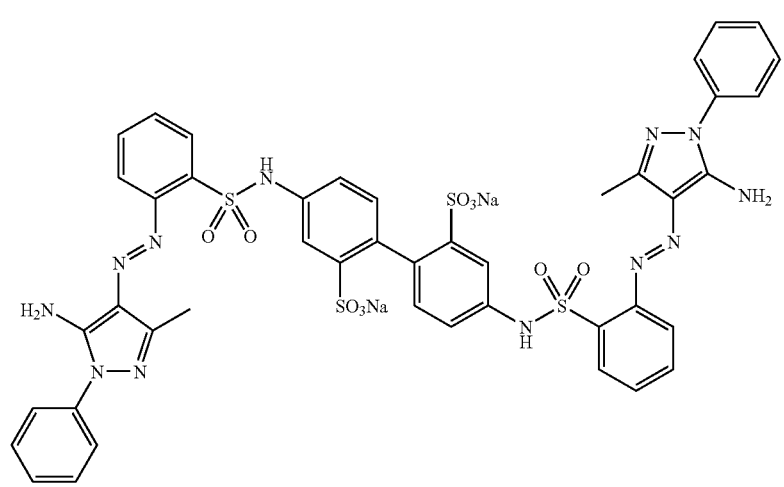
(32)
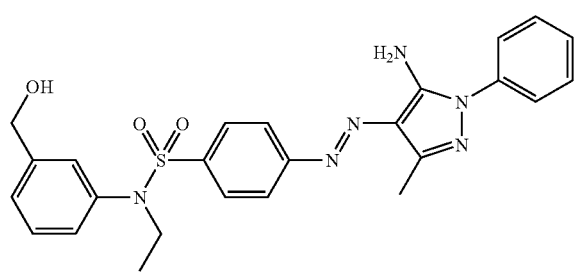
(33)
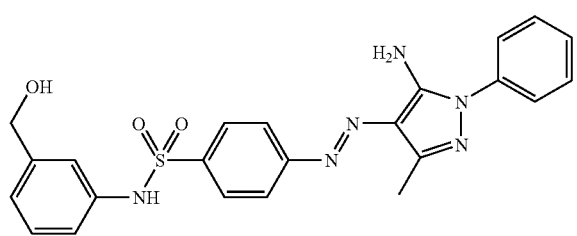

-continued (34)

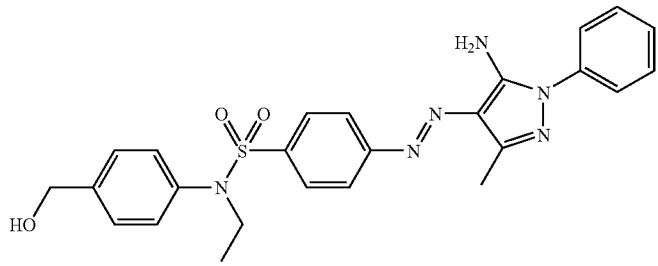

The azo compound represented by the formula (I) may be usually synthesized by, for example, a method in which a nitrobenzene derivative substituted with a desired compound is reduced and then made into a diazo compound, to which 5-amino-1-phenylpyrazole is then added. Various compounds involved in compounds represented by the formula (I) can be likewise synthesized by changing the aforementioned desired compound to other compounds and the type of substituent with which 5-amino-1-phenylpyrazole is substituted. The colorant represented by the above formula (I) may be combined with the same type of compound represented by the formula (I) and may be used together with other acidic dyes, salts of other acidic dyes and metals or nitrogen-containing compounds and derivatives of other acidic dyes.

-Acidic Dyes-

The above acidic dyes will be explained. As the acidic dye, any compound may be used without any particular limitation insofar as it has an acidic group such as sulfonic acid or carboxylic acid. However, the acidic dye is selected in consideration of all the abilities required such as solubility in an organic solvent and a developer, salt-forming ability, absorbance, interaction with other components in the curable composition, light fastness and heat resistance.

Specific examples of the acidic dyes are given below; however, these examples are not intended to be limiting of the invention. Examples of the acidic dye include:

acid alizarin violet N;
acid black 1, 2, 24, 48;
acid blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192;
acid chrome violet K;
acid Fuchsin;
acid green 1, 3, 5, 9, 16, 25, 27, 50;
acid orange 6, 7, 8, 10, 12, 50, 51, 52, 56, 63, 74 and 95;
acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 183, 198, 211, 215, 216, 217, 249, 252, 257, 260, 266, 274;
acid violet 6B, 7, 9, 17, 19;
acid yellow 1, 3, 7, 9, 11, 17, 23, 25, 29, 34, 36, 42, 54, 65, 72, 73, 76, 79, 98, 99, 111, 112, 114, 116, 169, 243;
Food Yellow 3; and derivatives of these dyes.
Among these dyes, dyes such as;
acid black 24;
acid blue 23, 25, 29, 62, 86, 87, 92, 138, 158;
acid orange 8, 51, 56, 74, 63, 74;
acid red 1, 4, 8, 34, 37, 42, 52, 57, 80, 97, 114, 143, 145, 151, 183, 217;
acid violet 7;
acid yellow 17, 23, 25, 29, 34, 42, 72, 76, 99, 111, 112, 114, 116, 163, 243; and derivatives of these dyes are preferable as the acidic dye.

Azo type, xanthene type or phthalocyanine type acidic dyes other than the above dyes are also preferable. For example, acidic dyes such as C.I. Solvent Blue 44, 38, C.I. Solvent Orange 45, Rhodamine B, Rhodamine 110, 2,7-Naphthalenedisulfonic acid, 3-[(5-chloro-2-phenoxyphenyl)hydrazono]-3,4-dihydro-4-oxo-5-[(phenylsulfonyl)amino]- and the like and derivatives of these dyes are also preferably used.

As the derivatives of the acidic dyes, compounds obtained by converting the sulfonic acid of the acidic dyes into a sulfonic acid amide or a sulfonate may be utilized advantageously.

-Atomic Group Forming a Salt with an Acidic Dye-

Any atomic group may be used as the atomic group forming a salt with the above acidic dye insofar as it is a cationic group forming a salt with an anion of the above acidic dye. Examples of the atomic group include Li, Na, K, Rb, Cs, Ag, Mg, Ca, Sr, Ba, Zn, Al, Ni, Cu, Co, Fe or cations constituted of nitrogen-containing compounds.

The nitrogen-containing compound forming a counter salt in combination with the acidic dye will be explained. The nitrogen-containing compound forming a salt in combination with the acidic dye in the invention is selected by taking into consideration of all of the solubility in an organic solvent or a developer, salt-forming characteristics, absorbance of the dye, interaction with other components in the curable composition and the like. If the nitrogen-compound is selected only from the viewpoint of absorbance, the molecular weight of the compound is preferably 245 or less, more preferably 240 or less and particularly preferably 230 or less.

Also, nitrogen-containing compounds that are generally known as a fading preventing agent may be used for preventing photo-fading and for improving heat resistance. From this point of view, compounds having a lower oxidation potential (lower ionization potential), tertiary amine compounds, aliphatic cyclic amine compounds, aniline compounds and hydrazine type compounds are preferable.

Preferable and specific examples of the nitrogen-containing compound are the same as those given as examples of M of —$SO_3M$ in the explanation of $R^4$ in the above formula (I).

-With Regard to the Molar Ratio of (Atomic Group Forming a Salt with the Compound (or Acidic Dye) of the Formula (1)/(Compound (or Acidic Dye) of the Formula (I))-

The molar ratio (hereinafter referred to as "L" if necessary) of (Atomic group forming a salt with the compound (or acidic dye) of the formula (I)/(Compound (or acidic dye) of the formula (I)) will be explained. The above L is a value deciding the molar ratio of the acidic dye molecule to an atomic group which is a counter ion and may be selected freely according to a salt-forming condition of the acidic dye atomic group. Specifically, L corresponding to the number of functional groups of the acid in the acidic dye is a value falling in the following range: $0 \leq L \leq 10$, and is selected by taking into consideration of all the order of priority of the necessary performances such as solubility in an organic solvent or a developer, salt-forming characteristics, absorbance, interaction with other components in the curable composition, light fastness and heat resistance. If L is selected only from the viewpoint of absorbance, it is preferable to adopt a value falling in the following range: $0 \leq L \leq 7$, it is more preferable to adopt a value falling in the following range: $0 \leq L \leq 6$ and it is still more preferable to adopt a value falling in the following range: $0 \leq L \leq 5$.

-Working Concentration-

Next, the working concentration of the compound (including other dyes when combining other dyes such as acidic dyes) represented by the formula (I) will be explained. The concentration of the compound (including other dyes when combining other dyes such as acidic dyes) represented by the formula (I) in all solid components of the dye-containing curable composition of the invention is preferably 0.5 to 80 mass %, more preferably 0.5 to 60 mass % and particularly preferably 0.5 to 50 mass %, though it differs depending on the type of dye.

<Binder>

Next, the binder will be explained. Although any binder material may be used as the binder used in the invention insofar as it is alkali-soluble, the binder is preferably selected from the viewpoint of heat resistance, developing characteristics and availability.

As the alkali-soluble binder, linear organic high molecular polymers which are alkali-soluble and can be developed using an aqueous weak alkali solution are preferable. Useful examples of the linear organic high molecular polymer include polymers having a carboxylic acid at the side chain, for example, methacrylic acid copolymers, acrylic acid copolymers, itaconic acid copolymers, crotonic acid copolymers, maleic acid copolymers and partially esterified maleic acid copolymers as described in each specification of JP-A No. 59-44615, JP-B No. 54-34327, JP-B No. 58-12577, JP-B No. 54-25957, JP-A No. 59-53836 and JP-A No. 59-71048. Also, acidic cellulose derivatives having a carboxylic acid at the side chain are useful. Other than the above, hydroxyl group-containing polymers to which an acid anhydride is added, polyhydroxystyrene type resins, polysiloxane type resins, poly(2-hydroxyethyl(meth)acrylate), polyvinylpyrrolidone, polyethylene oxide and polyvinyl alcohol are also useful.

Also, the above alkali-soluble binder may be those obtained by copolymerizing hydrophilic monomers. Examples of these copolymers include an alkoxyalkyl(meth)acrylate, hydroxyalkyl(meth)acrylate, glycerol (meth)acrylate, (meth)acrylamide, N-methylolacrylamide, secondary or tertiary alkylacrylamide, dialkylaminoalkyl(meth)acrylate, morpholine (meth)acrylate, N-vinylpyrrolidone, N-vinylcaprolactam, vinylimidazole, vinyltriazole, methyl (meth)acrylate, ethyl(meth)acrylate, branched or straight-chain propyl(meth)acrylate, branched or straight-chain butyl (meth)acrylate and phenoxyhydroxypropyl(meth)acrylate.

As other hydrophilic monomers, monomers containing a tetrahydrofurfuryl group, phosphoric acid, phosphate, quaternary ammonium salt, ethyleneoxy chain, propyleneoxy chain, sulfonic acid or its salt, morpholinoethyl group and the like are also useful.

These binder polymers may have a polymerizable group at the side chain and polymers containing an allyl group, (meth)acryl group, allyloxyalkyl group or the like at the side chain are also useful. These polymers having a polymerizable group will be shown below; however, these examples are not intended to be limiting of the invention, and any polymer having an alkali-soluble group such as a COOH group, OH group, ammonium group and the like and a carbon-carbon unsaturated bond may be used.

Compounds obtained by reacting a compound with a copolymer can be used. For example, a compound such as glycidylacrylate, having an epoxy ring having reactivity with a OH group and a carbon-carbon unsaturated bond group can be reacted with a copolymer of, for example, 2-hydroxyethylacrylate having a OH group, a methacrylic acid containing a COOH group, and an acryl type or vinyl type compound copolymerizable with these compounds may be used. In the reaction with an OH group, besides the epoxy ring, an acid anhydride or a compound having an isocyanate group or an acryloyl group may also be used. A reaction product may be used that is obtained by reacting a saturated or unsaturated polybasic acid anhydride with a compound obtained by reacting an unsaturated carboxylic acid such as an acrylic acid with a compound having an epoxy ring, as disclosed in JP-A Nos. 6-102669 and 6-1938.

Examples of the compound having a combination of an alkali-soluble group such as a COOH group and a carbon-carbon unsaturated group include Dianal NR series (manufactured by Mitsubishi Rayon Co., Ltd.), Photomer 6173 (COOH group-containing Polyurethane acrylic oligomer, manufactured by Diamond Sharmrock Co., Ltd.), Viscoat R-264 and KS Resist 106 (manufactured by Osaka Organic Chemical Industry Ltd.), Cyclomer P series and Plakcel CF 200 series (manufactured by Daicel Chemical Industries, Ltd.) and Ebecry 13800 (manufactured by Daicel UCB Co., Ltd.).

Among these various binders, a polyhydroxystyrene type resin, polysiloxane type resin, acryl type resin, acrylamide type resin and acryl/acrylamide copolymer resin are preferable and an acryl type resin, polyhydroxystyrene type resin and polysiloxane type resin are more preferable as the alkali-soluble binder used in the invention from the viewpoint of heat resistance. Also, an acryl type resin, acrylamide type resin and acryl/acrylamide copolymer resin are preferable from the viewpoint of controlling developing characteristics. As the acryl type resin, a copolymer produced from monomers selected from benzyl(meth)acrylate, (meth)acrylic acid, hydroxyethyl(meth)acrylate and (meth)acrylamide, (meth)acryl type resin having a polymerizable side chain, for example, Cyclomer P-series and Plakcel CF200 series (manufactured by Daicel Chemical Industries, Ltd.), Ebecry 13800 (manufactured by Daicel UCB Co., Ltd.), Dianal NR series (manufactured by Mitsubishi Rayon Co., Ltd.), Viscoat R-264 and KS Resist 106 (manufactured by Osaka Organic Chemical Industry Ltd.) and the like are preferable.

For example, alcohol-soluble nylon and a polyether of 2,2-bis-(4-hydroxyphenyl)-propane and epichlorohydrin are also preferable to improve the strength of a cured film.

As the binder used in the invention, an alkali-soluble phenol resin may be used. The alkali-soluble phenol resin may be preferably used when the composition of the invention is used as a positive type composition. Examples of the alkali-soluble phenol resin include novolac resins and vinyl polymers.

Examples of the above novolac resin include those obtained by condensing phenols with aldehydes in the presence of an acid catalyst. Examples of the phenols include phenol, cresol, ethylphenol, butylphenol, xylenol, phenylphenol, catechol, resorcinol, pyrogallol, naphthol and bisphenol A. These phenols may be used either singly or in combinations of two or more. Examples of these aldehydes include formaldehyde, paraformaldehyde, acetaldehyde, propionaldehyde and benzaldehyde.

Specific examples of the above novolac resin include methacresol, paracresol and condensed products of a mixture of these compounds with formalin. The distribution of molecular weight of the novolac resin may be regulated by means of fractionation or the like. Also, a low-molecular component having a phenolic hydroxyl group such as bisphenol C or bisphenol A may be mixed in the above novolac resin.

The above binder is a polymer having a weight average molecular weight (based on polystyrene, measured by a GPC method) of, preferably 1000 to $2\times10^5$, more preferably 2000 to $1\times10^5$, and particularly preferably 3000 to $5\times10^4$.

The amount of the binder to be used in the composition of the invention is preferably 10 to 90 mass %, more preferably 20 to 80 mass % and particularly preferably 30 to 70 mass % based on the total solid in the composition of the invention.

(Crosslinking Agent)

Next, explanations will be furnished as to the crosslinking agent. The purport of the invention is to obtain a layer having high hardenability by using the dye represented by the formula (I) and by allowing a hardening reaction to be advanced to a more high degree. It is possible to obtain a layer hardened to a more high degree than usual by using a supplementary crosslinking agent. Any crosslinking agent may be used without any particular limitation insofar as it can attain layer hardening by a crosslinking reaction. Examples of the crosslinking agent include (a) epoxy resins, (b) melamine compounds, guanamine compounds, glycoluril compounds or urea compounds substituted with at least one substituent selected from a methylol group, alkoxymethyl group and acyloxymethyl group and (c) phenol compounds, naphthol compounds or hydroxyanthracene compounds substituted with at least one substituent selected from a methylol group, alkoxymethyl group and acyloxymethyl group and polyfunctional epoxy resins are particularly preferable.

Any compound may be used as the epoxy resin which is the component (a) without any particular limitation insofar as it has an epoxy group and crosslinking characteristics. Examples of these compounds divalent glycidyl group-containing low-molecular compounds such as bisphenol-A-diglycidyl ether, ethylene glycol diglycidyl ether, butane diol diglycidyl ether, hexane diol diglycidyl ether, dihydroxybiphenyl diglycidyl ether, diglycidyl phthalate and N,N-diglycidylaniline, trivalent diglycidyl group-containing low-molecular compounds represented by, for example, trimethylolpropane triglycidyl ether, trimethylolphenol triglycidyl ether and Tris P-PAtriglycidyl ether, tetravalent glycidyl group-containing low-molecular compounds represented by, for example, pentaerythritol tetraglycidyl ether and tetramethylol bisphenol-A-tetraglycidyl ether, polyvalent glycidyl group-containing low-molecular compounds such as dipentaerythritol pentaglycidyl ether and dipentaerythritol hexaglycidyl ether and glycidyl group-containing high-molecular compounds represented by polyglycidyl (meth)acrylate and a 1,2-epoxy-4-(2-oxyranyl)cyclohexane adduct of 2,2-bis(hydroxymethyl)-1-butanol.

The number of substituted methylol groups, alkoxymethyl groups or acyloxymethyl groups contained in the component (b) is 2 to 6 in the case of a melamine compound and 2 to 4 in the case of a glycoluril compound, guanamine compound or urea compound, and preferably 5 to 6 in the case of a melamine compound and 3 to 4 in the case of a glycoluril compound, guanamine compound or urea compound.

These methylol group-containing compounds are obtained by heating the aforementioned alkoxymethyl group-containing compound in alcohol in the presence of an acid catalyst such as hydrochloric acid, sulfuric acid, nitric acid and methanesulfonic acid. The alkoxymethyl group-containing compound is obtained by mixing a methylol group-containing compound acyl chloride in the presence of a basic catalyst with stirring.

Specific examples of the compound having a substituent and contained in the component (b) will be explained.

Examples of the above melamine compound include hexmethylolmelamine, hexamethoxymethylmelamine, compounds obtained by methoxymethylating 1 to 5 methylol groups of hexamethylolmelamine or mixtures of these compounds, hexamethoxyethylmelamine, hexaacyloxymethylmelamine, compounds obtained by acyloxymethylating 1 to 5 methylol groups of hexamethylolmelamine or mixtures of these compounds.

Examples of the above guanamine compound include tetramethylolguanamine, tetramethoxymethylguanamine, compounds obtained by methoxymethylating 1 to 3 methylol groups of tetramethylolguanamine or mixtures of these compounds, tetramethoxyethylguanamine, tetraacyloxymethylguanamine, compounds obtained by acyloxymethylating 1 to 3 methylol groups of tetramethylolguanamine or mixtures of these compounds.

Examples of the above glycoluril compound include tetramethylolglycoluril, tetramethoxymethylglycoluril, compounds obtained by methoxymethylating 1 to 3 methylol groups of tetramethylolglycoluril or mixtures of these compounds and compounds obtained by acyloxymethylating 1 to 3 methylol groups of tetramethylolglycoluril or mixtures of these compounds.

Examples of the above urea compound include tetramethylolurea, tetramethoxymethylurea, compounds obtained by methoxymethylating 1 to 3 methylol groups of tetramethylolurea or mixtures of these compounds and tetramethoxyethylurea. These compounds may be used either singly or in combinations.

The phenol compound, naphthol compound or hydroxyanthracene compound substituted with at least one group selected from a methylol group, alkoxymethyl group and acyloxymethyl group and contained as the above component (c) restrains intermixing with a finish coating photoresist by heat crosslinking and more improves layer strength in the same manner as in the case of the component (b).

It is necessary that the number of methylol groups, acyloxymethyl groups or alkoxymethyl groups contained in the component (c) is at least 2 per molecule and phenolic compounds which are substituted at all of the second and fourth positions are preferable.

Also, the naphthol compound and hydroxyanthracene compound which are the skeleton are preferably those in which the ortho and para positions with respect to the OH group are all substituted.

The third or fifth position of the phenol compound which is the skeleton may be unsubstituted or may have a substituent. Also in the naphthol compound which is the skeleton, positions other than the ortho position with respect to the OH group may be unsubstituted or may have a substituent.

These methylol group-containing compounds are obtained by using, as starting material, a compound in which the ortho or para position (second or fourth position) with respect to the phenolic OH group is a hydrogen atom and by reacting the compound with formalin in the presence of a basic catalyst such as sodium hydroxide, potassium hydroxide, ammonia and tetraalkylammonium hydroxide.

Also, the alkoxymethyl group-containing compound is obtained by heating the aforementioned methylol group-containing compound in alcohol in the presence of an acid catalyst such as hydrochloric acid, sulfuric acid, nitric acid or methanesulfonic acid.

The acyloxymethyl group-containing compound is obtained by reacting the aforementioned methylol group-containing compound with acyl chloride in the presence of a basic catalyst.

Examples of the skeleton compound phenol compounds, naphthol compounds and hydroxyanthracene compounds in which the ortho or para position with respect to the phenolic OH group is unsubstituted. For example, phenol, each isomer of cresol, 2,3-xylenol, 2,5-xylenol, 3,4-xylenol, 3,5-xylenol, bisphenols such as bisphenol-A, 4,4'-bishydroxybiphenyl, Tris P-PA (manufactured by Honshu Chemical Industry Co., Ltd.), naphthol, dihydroxynaphthalene, 2,7-dihydroxyanthracene or the like is used.

Specific examples of the above component (c) include trimethylol phenol, tri(methoxymethyl)phenol, compounds obtained by methoxy-methylating 1 to 2 methylol groups of trimethylol phenol, trimethylol-3-cresol, tri(methoxymethyl)-3-cresol, compounds obtained by methoxy-methylating 1 to 2 methylol groups of trimethylol-3-cresol, dimethylol cresol such as 2,6-dimethylol-4-cresol, tetramethylol bisphenol-A, tetramethoxymethyl bisphenol-A, compounds obtained by methoxy-methylating 1 to 3 methylol groups of tetramethylol bisphenol-A, tetramethylol-4,4'-bishydroxybiphenyl, tetramethoxymethyl-4,4'-bishydroxybiphenyl, hexamethylol isomer of Tris P-PA, hexamethoxymethyl isomer of Tris-PA, compounds obtained by methoxy-methylating 1 to 5 methylol groups of an hexamethylol isomer of Tris P-PA and bishydroxymethylnaphthalenediol.

Examples of the hydroxyanthracene compound include 1,6-dihydroxymethyl-2,7-dihydroxyanthracene.

Examples of the acyloxymethyl group-containing compound include compounds obtained by acyloxy-methylating a part or all of the methylol groups of the aforementioned methylol group-containing compounds.

Preferable compounds among these compounds are trimethylol phenol, bishydroxymethyl-p-cresol, tetramethylolbisphenol A, hexamethylol isomers of tris P-PA (manufactured by Honshu Chemical Industry Co., Ltd.) or phenol compounds obtained by substituting the methylol groups of these compounds with an alkoxymethyl group or both of a methylol group and an alkoxymethyl group.

These compounds may be used either singly or in combinations.

The content of the components (a) to (c) in the dye-containing curable composition of the invention is preferably 1 to 70 mass %, more preferably 5 to 50 mass % and particularly preferably 7 to 30 mass % though it differs depending on the type of raw material.

(Monomer)

Next, explanations will be furnished as to the polymerizable compound (hereinafter referred to as "monomer") contained when the composition of the invention is a negative type composition. As the monomer, compounds having at least one addition-polymerizable ethylene group and a boiling point of 100° C. or more under normal pressure are preferable. Examples of the monomer include monofunctional acrylates or methacrylates such as a polyethylene glycol mono(meth)acrylate, polypropylene glycol mono (meth)acrylate and phenoxyethyl(meth)acrylate; polyethylene glycol di(meth)acrylate, trimethylolethanetri(meth)acrylate, neopentyl glycol di(meth)acrylate, pentaerythritol tri (meth)acrylate, pentaerythritol tetra(meth)acrylate, dipentaerythritol penta(meth)acrylate, dipentaerythritol hexa(meth)acrylate, hexanediol (meth)acrylate, trimethylolpropanetri(acryloyloxypropyl) ether, tri(acryloyloxyethyl)isocyanurate, compounds obtained by adding an ethylene oxide or propylene oxide to polyfunctional alcohols such as glycerin and trimethylolethane, followed by (meth)acrylating, urethaneacrylates as described in each publication of JP-B No. 48-41708, JP-B No. 50-6034 and JP-A No. 51-37193, polyester acrylates described in each publication of JP-A No. 48-64183, JP-B No. 49-43191 and JP-B No. 52-30490 and polyfunctional acrylates or methacrylates such as epoxyacrylates which are reaction products of epoxy resins and (meth)acrylates and mixtures of these compounds. Further, those introduced as photocurable monomers and oligomers in J. Japan Adhesive Association, Vol. 20, No. 7, page 300 to page 308 are exemplified.

As the above monomer, (meth)acryl ester type monomers are preferable and tetra- or more-functional (meth)acryl ester type monomers are particularly preferable.

The content of the above monomer in the composition of the invention is preferably 0.1 to 90 mass %, more preferably 1.0 to 80 mass % and particularly preferably 2.0 to 70 mass % based on solid content.

(Photoinitiator)

Next, explanations will be offered as to the photoinitiator contained in the composition of the invention when the composition is a negative type composition. Although any photoinitiator may be used as the photoinitiator insofar as it can polymerize the aforementioned polymerizable monomer, it is preferably selected from the viewpoint of, for example, characteristics, initiating efficiency, absorbing wavelength, availability and cost.

Examples of the photoinitiator include a trihalomethyltriazine type compound, benzyldimethylketal compound, α-hydroxyketone compound, α-aminoketone compound, phosphine oxide type compound, metallocene compound, oxime type compound, triallylimidazole dimer, benzothiazole type compound, benzophenone compound, acetophenone compound and its derivative, cyclopentadiene-benzene-iron complex and its salt, halomethyloxadiazole compound and 3-aryl substituted cumarin compound. The photoinitiator preferably contains at least one compound selected from the group consisting of an α-aminoketone compound, phosphine oxide type compound, metallocene compound, oxime type compound and triallylimidazole dimer.

Also, the photoinitiator is preferably compounds resistant to the generation of acids when decomposed.

Examples of the active halogen compound such as halomethyloxadiazole compounds include 2-halomethyl-5-vinyl-1,3,4-oxadiazole compounds described in the publication of JP-B No. 57-6096, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole.

Examples of the photoinitiator of the trihalomethyl-s-triazine type compound include vinyl-halomethyl-s-triazine compounds described in the publication of JP-B No. 59-1281 and 2-(naphtho-1-yl)-4,6-bis-halomethyl-s-triazine compounds and 4-(p-aminophenyl)-2,6-di-halomethyl-s-triazine compounds described in the publication of JP-A No. 53-133428.

Other examples of the photoinitiator include 2,4-bis (trichloromethyl)-6-p-methoxystyryl-s-triazine, 2,6-bis (trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-trizine, 2-[4-(2-ethoxyethyl)-naphtho-1-yl]-4,6-bis-trichloromethyl-s-trizine, 2-[4-(2-butoxyethyl)-naphtho-1-yl]-4,6-bis-trichloromethyl-s-triazine, 2-(2- methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine;

2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl)aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine;

4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine;

4-[m-fluro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine and 4-(o-fluoro-p-N-chloroethylaminophenyl)-2,6-di(trichloromethyl)-s-triazine.

Other than the above, TAZ series manufactured by Midori Kagaku Co., Ltd. (TAZ-107, TAZ-110, TAZ-104, TAZ-109, TAZ-140, TAZ-204, TAZ-113, TAZ-123 and TAZ-104), T series manufactured by PANCHIM (T-OMS, T-BMP, T-R and T-B), Irgacure series manufactured by Ciba Specialty Chemicals Corp. (Irgacure 651, Irgacure 184, Irgacure 500, Irgacure 1000, Irgacure 149, Irgacure 819 and Irgacure 261), Darocure series manufactured by Ciba Specialty Chemicals Corp. (Darocure 11734), 4'-bis(diethylamino)-benzophenone, 2-(O-benzoyloxime)-1-[4-(phenylthio)phenyl]-1,2-octanedione, 2-benzyl-2-dimethylamino-4-morpholinobutyrophenone, 2,2-dimethoxy-2-phenylacetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer, benzoinisopropyl ether and the like are used advantageously. Also, examples of the α-aminoketone type compound include Irgacure series manufactured by Ciba Specialty Chemicals Corp. (Irgacure 907 and Irgacure 369), 2-methyl-1-phenyl-2-morpholinopropan-1-one, 2-methyl-1-[4-(hexyl)phenyl]-2-morpholinopropan-1-one and 2-ethyl-2-dimethylamino-1-(4-morpholinophenyl)-butanone-1.

Examples of the above oxime type compound include, though not limited to, 2-(O-benzoyloxime)-1-[4-(phenylthio)phenyl]-1,2-octanedione, 1-(4-methylsulfanyl-phenyl)-butane-1,2-butane-2-oxime-O-acetate, 1-(4-methylsulfanyl-phenyl)-butane-1-onoxime-O-acetate, hydroxyimino-(4-methylsulfanyl-phenyl) ethyl acetate-O-acetate and hydroxyimino-(4-methylsulfanyl-phenyl)-ethyl acetate-O-benzoate.

Other preferable examples of the initiators are Irgacure 651 and the like as the benzyldimethylketal compound, Irgacure 184, 1173, 500, 1000 and 2959 and the like as the α-hydroxyketone compound, Irgacure 907 and 369 and the like as the α-aminoketone compound, Irgacure 1700, 149, 1850, 819 and 184 and the like as the phosphine oxide type compound (blend) and Irgacure 784 and 261 (the above products are all manufactured by Ciba Specialty Chemicals Corp.) as the metallocene compound in view of availability and stability. Analogues and/or peripheral compounds of these compounds are also likewise preferable.

As mentioned above, it is preferable to use compounds generating no acid when decomposed in view of the light fastness and heat resistance of a dye. Specifically, as the compound generating no acid when decomposed among the above compounds, at least one compound selected from benzyldimethylketal compounds, α-hydroxyketone compounds, α-aminoketone type compounds, phosphine oxide type compounds, metallocene compounds, oxime type compounds, triallylimidazole dimers, benzothiazole type compounds, benzophenone compounds, acetophenone compounds and their derivatives and cyclopentadiene-benzene-iron complexes and their salts is preferable. At least one compound selected from α-aminoketone type compounds, phosphine oxide type compounds, metallocene compounds, oxime type compounds and triallylimidazole dimers is preferable.

These photoinitiators may be combined with sensitizers and photo-stabilizers.

Specific examples of these sensitizers and photo-stabilizers include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, thioxanthone, 2,4-diethylthioxanthone, acridone, 10-butyl-2-chloroacridone, benzyl, dibenzalacetone, p-(dimethylamino)phenylstyryl ketone, p-(dimethylamino)phenyl-p-methylstyryl ketone, benzophenone, p-(dimethylamino)benzophenone (or Michler's ketone), p-(diethylamino)benzophenone, benzoanthrone, benzothiazole type compounds described in the publication of JP-B No. 51-48516 and Tinubin 1130 and 400.

The composition of the invention may use other known photoinitiators besides the aforementioned photoinitiators.

Specific examples of these known photoinitiators may include vicinal polyketolaldonyl compounds disclosed in the specification of U.S. Pat. No. 2,367,660, α-carbonyl compounds disclosed in each specification of U.S. Pat. Nos. 2,367,661 and 2,367,670, acyloin ethers disclosed in the specification of U.S. Pat. No. 2,448,828, aromatic acyloin compounds substituted with an α-hydrocarbon as described in the specification of U.S. Pat. No. 2,722,512, polynuclear quinone compounds disclosed in each specification of U.S. Pat. Nos. 3,046,127 and 2,951,758, a combination of a triallylimidazole dimer/p-aminophenyl ketone as disclosed in the specification of U.S. Pat. No. 3,549,367 and benzothiazole type compound/trihalomethyl-s-triazine type compound disclosed in the publication of JP-B No. 51-48516.

The amount of the photoinitiator to be used is preferably 0.01 mass % to 50 mass %, more preferably 1 mass % to 30 mass % and particularly preferably 1 mass % to 20 mass % based on the solid content of the monomer. When the amount of the photoinitiator is in a range from 0.01 mass % to 50 mass %, it is possible to prevent the occurrence of the phenomenon that the molecular weight of the composition becomes so low that the film strength becomes low.

The composition of the invention is preferably further compounded of a thermal polymerization preventive besides the above ingredients. Useful compounds as the thermal polymerization preventive are, for example, hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol) and 2-mercaptobenzoimidazole.

<Solvent>

Any solvent may be used as the solvent used in the invention without any particular limitation basically insofar as the solubility and coatability of the composition are satisfied. It is however preferable that the solvent be selected in consideration of the solubilities of the dye and binder, coatability and safety.

As the solvent used in the preparation of the composition of the invention, esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl ethoxyacetate, butyl methoxyacetate, methyl ethoxyacetate and ethyl ethoxyacetate;

alkyl esters 3-oxypropionates such as methyl 3-oxypropionate and ethyl 3-oxypropionate; methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate;

methylpyruvate, ethyl pyruvate, propyl pyruvate, methyl acetoacetate, ethyl acetoacetate, methyl 2-oxobutanate and ethyl 2-oxobutanate; ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether;

propylene glycol methyl ether, propylene glycol methyl ether acetate, propylene glycol ethyl ether acetate and propylene glycol propyl ether acetate; ketones such as methyl ethyl ketone, cyclohexanone, 2-heptanone and 3-heptanone; aromatic hydrocarbons such as toluene and xylene.

Among these solvents, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethylcarbitol acetate, butylcarbotol acetate, propylene glycol methyl ether and propylene glycol methyl ether acetate are more preferable.

The composition of the invention may be compounded of various additives, for example, fillers, high-molecular compounds other than the above compounds, surfactants, adhesion promoters, antioxidants, ultraviolet absorbers and coagulation preventives according to the need.

Specific examples of these additives may include fillers such as glass and alumina; high-molecular compounds, other than binder resins, such as a polyvinyl alcohol, polyacrylic acid, polyethylene glycol monoalkyl ether and polyfluoroalkylacrylate; nonionic, cationic or anionic surfactants; adhesion promoters such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltrimethoxysilane; antioxidants such as 2,2-thiobis(4-methyl-6-t-butylphenol) and 2,6-di-t-butylphenol; ultraviolet absorbers such as 2-(3-t-butyl-5-methyl-2-hydroxyphenyl)-5-chlorobenzotriazole and alkoxybenzophenone; and coagulation preventives such as sodium polyacrylate.

An organic carboxylic acid and preferably a low-molecular organic carboxylic acid having a molecular weight of 1000 or less may be added to the composition of the invention in the case of promoting the alkali-solubility of a portion irradiated with radial rays and more improving the developing characteristics of the composition of the invention. Specific examples of the organic carboxylic acid include aliphatic monocarboxylic acids such as formic acid, acetic acid, propionic acid, butyric acid, valeric acid, pivalic acid, caproic acid, diethylacetic acid, enanthic acid and caplyric acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxylic acids such as benzoic acid, toluic acid, cuminic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydroatropic acid, hydrocinnamic acid, mandelic acid, phenylsuccinic acid, atropic acid, cinnamic acid, methyl cinnamate, benzyl cinnamate, cinnamylidene acetic acid, coumaric acid and umbellic acid.

(Positive Type Composition)

In order to obtain a positive type image, namely in the case where the composition of the invention is a positive type composition, a photosensitizer is contained together with a solvent in the composition of the invention. As the photosensitizer, a naphthoquinonediazide compound is preferable. Also, the positive type colorant-containing curable composition may contain a hardener.

Examples of the aforementioned naphthoquinonediazide compound include o-benzoquinonediazide sulfonate and o-naphthoquinonediazide sulfonate. Specific examples of the naphthoquinonediazide compound include o-naphthoquinonediazido-5-sulfonate, o-naphthoquinonediazido-5-sulfonic acid amide, o-naphthoquinonediazido-4-sulfonate and o-naphthoquinonediazido-4-sulfonic acid amide. These esters and amide compounds may be produced by a known method by using, for example, a phenol compound represented by the formula (I) described in each publication of JP-A Nos. 2-84650 and 3-49437.

When the composition of the invention is a positive type composition, the aforementioned alkali-soluble phenol resin and hardener are preferably dissolved in a proportion of about 2 to 50 mass % and in a proportion of about 2 to 30 mass % respectively in the organic solvent in usual. With regard to the amounts of the aforementioned naphthoquinonediazide compound and organic solvent-soluble dye, it is usually preferable to add the naphthoquinonediazide compound and the organic solvent-soluble dye in an amount of about 2 to 30 mass % and in an amount of about 2 to 50 mass % respectively based on the solution in which the aforementioned alkali-soluble resin and hardener are dissolved.

As the above hardener, the melamine type compounds and methylol group-containing compounds exemplified as the crosslinking agent are preferably used.

In the case of the positive type composition, an alkali-soluble resin may be mixed upon use. Examples of the resin include novolac resins and vinylphenol resins.

Also, when the colorant-containing curable composition of the invention is made to have a positive structure, it may be structured by compounding the compound represented by the formula (I), a photo-acid generating agent and a hardener.

No particular limitation is imposed on the above photo-acid generating agent insofar as it generates an acid by exposure. Examples of the photo-acid generating agent include various oxime type compounds such as α-(4-toluenesulfonyloxyimino)phenylacetonitrile, various iodonium compounds, various sulfonium compounds and various trihalomethyltriazine compounds.

<<Color Filter>>

The color filter of the invention contains at least the compound (azo compound of the invention) represented by the formula (I) as the colorant. Also, the color filter is preferably produced using the composition of the invention.

The color filter of the invention may be produced by applying the composition of the invention to a support by using a coating method such as rotary coating, cast coating or roll coating to form a radiation-sensitive composition layer, which is then exposed to light through a specified mask pattern and then developed by a developer to form a colored pattern. Also, the method of producing the color filter of the invention may involve a step of curing the above resist by heating and/or exposure according to the need.

Particularly, ultraviolet rays such as g-rays, h-rays or i-rays are preferably used as the radiation to be used.

Examples of the support include soda glass, Pyrex (R) glass, quartz glass, those obtained by sticking a transparent conductive film to each of these materials, photoelectric conversion element substrate used for imaging devices and the like, for example, a silicon substrate and complementary metal oxide semiconductor (CMOS). There is the case where these supports are formed with a black stripe isolating each pixel optically.

An undercoat layer may be formed on the support according to the need with the intention of improving adhesion to the upper layer, preventing the diffusion of materials and flattening the surface of the substrate according to the need.

Any material may be used as the developer used in the method of producing a color filter according to the invention insofar as it dissolves the composition of the invention and in turn, does not dissolve the portion irradiated with radial rays. Specifically, as the developer, a combination of these organic solvents or an aqueous alkaline solution may be used.

Examples of the organic solvent include the aforementioned solvents used to prepare the composition of the invention.

As the aqueous alkaline solution, an aqueous alkaline solution is used in which an alkali compound such as sodium hydroxide, potassium hydroxide, sodium carbonate, sodium silicate, sodium methasilicate, aqueous ammonia, ethylamine, diethylamine, dimethylethanolamine, tetramethylammonium hydroxide, tetraethylammonium hydroxide, choline, pyrrole, piperidine or 1,8-diazabicyclo-[5.4.0]-7-undecene is dissolved in water in a concentration of 0.001 to 10 mass % and preferably 0.01 to 1 mass % is used. When a developer comprising an aqueous alkaline solution is used, the developed layer is usually washed with water.

Also, the color filter of the invention may be used for liquid crystal elements and solid imaging elements such as CCDs and are particularly preferably suitable to high-resolution CCD elements with pixels exceeding 1,000,000 in number and CMOS elements. The color filter of the invention may be used, for example, as a color filter disposed between the light-receptor section of each pixel constituting a CCD and a microlens for converging light.

EXAMPLES

The invention will be hereinafter explained in detail by way of examples, which, however, are not intended to be limiting of the invention. In these examples, "parts" are on mass basis unless otherwise noted.

<Synthesis of the Azo Compound of the Invention>

Synthesis examples will be explained as an embodiment of the azo compound of the invention.

Synthesis Example 1

Synthesis of the Exemplified Compound (1)

An azo compound according to the invention was synthesized according to the following process. The numerals (1) to (5) shown in the following each reaction step indicate the compounds (1) to (5).

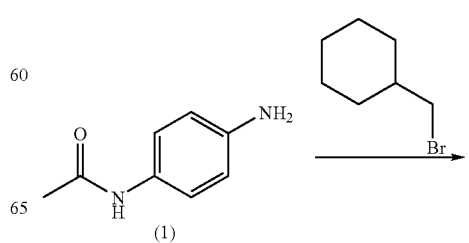

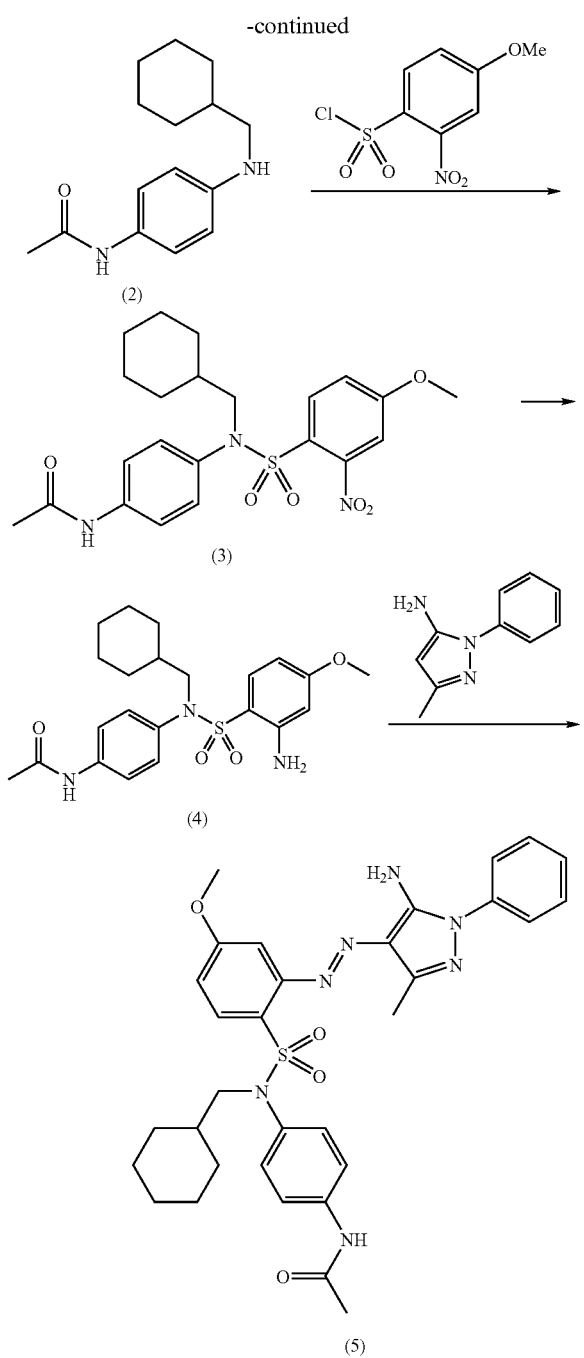

7.00 g of p-aminoacetoanilide (the above compound (1)), 8.54 g of cyclohexylmethyl bromide, 20 g of dimethylformamide (DMF) and 4.72 g of triethylamine were mixed and the mixture was stirred at 50° C. for 6 hours. After the stirring was finished, the reaction mixture was poured into water, which was then extracted with ethyl acetate. The ethyl acetate phase was washed with water several times. Magnesium sulfate and activated carbon were added to this ethyl acetate phase to carry out drying and discoloration and then subjected to filtration using celite. The ethyl acetate phase was concentrated and recrystallized from hexane/ethyl acetate to obtain 6.83 g of the aforementioned compound (2) (yield: 59.5%).

Next, 10.00 g of the compound (2) obtained in the above manner was mixed with 9.73 g of 4-methoxy-2-nitrobenzenesulfonyl chloride and 20 g of orthodichlorobenzene and the mixture was stirred at ambient temperature for one hour. The mixture was raised to 50° C. and then 4.13 g of sodium carbonate was added to the mixture, which was then stirred at 70° C. for further one hour. Then, the reaction mixture was poured into water, which was then extracted with ethyl acetate. The ethyl acetate phase was washed with an aqueous 4% sulfuric acid solution. Then, magnesium sulfate and activated carbon were added to this ethyl acetate phase to carry out drying and discoloration and then subjected to filtration using celite. The ethyl acetate phase was concentrated to obtain 16.82 g of the aforementioned compound (3) (yield: 100%).

Next, 6.5 g of reduced iron, 5.0 g of acetic acid and 30.0 g of water were mixed and the mixture was stirred at 80° C. 16.82 g of the compound (3) obtained above was added gradually to the mixture and stirred at 80° C. for 2 hours. 1.5 g of sodium carbonate was further added to the mixture, which was then stirred at 80° C. for 30 minutes. After the reaction mixture was cooled to ambient temperature, 50 ml of ethyl acetate, celite and activated carbon were further added to the reaction mixture to carry out celite-filtration. Then, the organic layer was distilled using steam to obtain 12.07 g of the aforementioned compound (4) (yield: 72%).

Then, 3.00 g of the compound (4) was mixed with 0.09 g of tetraethylammonium chloride, 6.1 ml of acetic acid and 3.9 ml of 36% hydrochloric acid and the mixture was cooled to 0° C. To the mixture was added dropwise an aqueous sodium nitrite solution ($NaNO_2$: 0.52 g, water: 1.7 g) while keeping the internal temperature at 5° C. or less and the resulting mixture was stirred for 3 hours while keeping the temperature at 5 to 10° C. after the dropwise addition (diazo solution).

This diazo solution was added dropwise to a slurry solution of 5-amino-3-methyl-1-phenylpyrazole (13.33 g of 5-amino-3-methyl-1-phenylpyrazole, 10.0 g of water and 2.0 ml of 36% hydrochloric acid) prepared separately at 0° C. over 30 minutes. Next, 30 ml of an aqueous 40% sodium acetate solution was added dropwise to the mixture over one hour and the mixture was stirred at 0° C. for 2 hours. Then, 20 ml of an aqueous 10% sodium carbonate solution was added dropwise to the mixture, which was stirred all night. Then, 7.0 g of an aqueous 50% NaOH solution was added dropwise to the mixture, which was raised to 65° C., stirred for one hour and then cooled to ambient temperature. The resulting mixture was subjected to filtration and the residue was washed with alkaline saline to obtain 3.49 g of the aforementioned compound (5) (the foregoing exemplified compound (1)) which was the azo compound intended in the invention (yield: 79.3%).

The azo compound obtained above was investigated to confirm its structure by NMR to obtain the following results:
$^1$H-NMR (300 MHz, solvent: dimethyl-d6sulfoxide, standard material: tetramethylsilane) δ9.90 ppm (1H, s), 7.80 (2H, br. s), 7.60 (2H, d), 7.55-7.40 (6H, m), 7.22 (1H, s), 6.95 (1H, d), 6.85 (2H, d), 3.85 (3H, s), 3.25 (2H, d), 2.40 (3H, s), 1.98 (3H, s), 1.70-1.40 (5H, m), 1.20-0.90 (4H, m), 0.90-0.70 (2H, m).

Also, the azo compound was dissolved in methanol to prepare a solution having a concentration of $1.0 \times 10^{-5}$ mol/l, which solution was used to measure the maximum absorption wavelength (λmax) and molar extinction coefficient (ε) of the azo compound by using a spectrophotometer UV-2500PC (manufactured by Shimadzu Corporation and the half-value width was measured from the waveform. As a result, λmax and ε in methanol were 403 nm and 10200 [l·mol$^{-1}$ cm$^{-1}$] respectively (in this case, the half-value width could not be measured from the waveform).

Synthesis Example 2

The azo compound (the foregoing exemplified compound (2)) of the invention was obtained in the same manner as in Synthesis Example 1 except that the compound (2) was altered to cyclohexylamine and 4-methoxy-2-nitrobenzenesulfonyl chloride was altered to 2-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ8.00 ppm (2H, s), 7.91 (1H, d), 7.79 (1H, d), 7.67 (1H, t), 7.60-7.50 (4H, m), 7.50-7.35 (2H, m), 7.18 (1H, d), 3.20 (1H, m), 2.43 (3H, s), 1.55 (4H, m), 1.45 (1H, m), 1.25-0.90 (5H, m). λmax=392 nm, ε=17000 [l·mol$^{-1}$ cm$^{-1}$] and the half-value width=128 nm in methanol.

Synthesis Example 3

The azo compound (the foregoing exemplified compound (3)) of the invention was obtained in the same manner as in Synthesis Example 1 except that the compound (2) was altered to cyclohexylamine. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ8.02 ppm (2H, s), 7.85 (1H, d), 7.60-7.45 (4H, m), 7.40 (1H, m), 7.25 (1H, s), 7.02-6.85 (2H, m), 3.85 (3H, s), 3.10 (1H, m), 2.43 (3H, s), 1.55 (4H, m), 1.42 (1H, m), 1.20-0.85 (5H, m). λmax=394 nm, ε=17000 [l·mol$^{-1}$ cm$^{-1}$] and the half-value width=135 nm in methanol.

Synthesis Example 4

The azo compound (the foregoing exemplified compound (4)) of the invention was obtained in the same manner as in Synthesis Example 1 except that the compound (2) was altered to N-ethylaniline. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ7.80 ppm (2H, s), 7.63 (1H, d), 7.60-7.45 (4H, m), 7.40 (1H, m), 7.30-7.10 (4H, m), 7.02-6.85 (3H, m), 3.85 (3H, s), 3.55 (2H, q), 2.43 (3H, s), 0.90(3H, t). λmax=401 nm, ε=15800 [l·mol$^{-1}$ cm$^{-1}$] and the half-value width=141 nm in methanol.

Synthesis Example 5

The azo compound (the foregoing exemplified compound (5)) of the invention was obtained in the same manner as in Synthesis Example 1 except that the compound (2) was altered to N-ethylaniline and 4-methoxy-2-nitrobenzenesulfonyl chloride was altered to 2-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ7.82-7.62 ppm (5H, m), 7.60-7.45 (4H, m), 7.45 (1H, m), 7.30 (2H, m), 7.30-7.10 (3H, m), 7.00 (2H, d), 3.59 (2H, q), 2.40 (3H, s), 0.93(3H, t). λmax=399 nm, ε=15500 [l·mol$^{-1}$ cm$^{-1}$] and the half-value width=139 nm in methanol.

Synthesis Example 6

The azo compound (the foregoing exemplified compound (22)) of the invention was obtained in the same manner as in Synthesis Example 1 except that the compound (2) was altered to 3-hydroxymethylaniline and 4-methoxy-2-nitrobenzenesulfonyl chloride was altered to 2-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ10.00 ppm (1H, s), 8.00 (2H, s), 7.78 (2H, d), 7.45-7.65 (5H, m), 7.30-7.50 (2H, m), 7.05-7.20 (2H, m), 6.95 (2H, d), 5.18 (1H, t), 4.35 (2H, d), 2.40 (3H, s). λmax=395 nm, ε=16600 [l·mol$^{-1}$ cm$^{-1}$] and the half-value width=135 nm in methanol.

Synthesis Example 7

The azo compound (the foregoing exemplified compound (6)) of the invention was obtained in the same manner as in Synthesis Example 1 except that the compound (2) was altered to p-chloro-N-methylaniline and 4-methoxy-2-nitrobenzenesulfonyl chloride was altered to 2-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ7.85-7.65 ppm (5H, m), 7.60-7.45 (4H, m), 7.30-7.50 (2H, m), 7.20 (2H, d), 7.05 (2H, d), 3.05 (3H, s), 2.40 (3H, s). λmax=402 nm, ε=14400 [l·mol$^{-1}$ cm$^{-1}$] and the half-value width=142.5 nm in methanol.

Synthesis Example 8

The azo compound (the foregoing exemplified compound (24)) of the invention was obtained in the same manner as in Synthesis Example 1 except that the compound (2) was altered to 3,4-dimethoxyaniline and 4-methoxy-2-nitrobenzenesulfonyl chloride was altered to 2-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ9.45 ppm (1H, s), 7.94 (2H, s), 7.79 (1H, d), 7.71 (1H, d), 7.65 (2H, d), 7.56 (5H, m), 7.40 (2H, m), 6.71 (1H, d), 6.53 (2H, m), 3.61 (3H, s), 3.56 (3H, s), 2.40 (3H, s). λmax=397 nm, ε=14100 [l·mol$^{-1}$ cm$^{-1}$] and the half-value width=150.5 nm in methanol.

Synthesis Example 9

The azo compound (the foregoing exemplified compound (25)) of the invention was obtained in the same manner as in Synthesis Example 1 except that the compound (2) was altered to 4'-(N-ethylamino)-acetophenone and 4-methoxy-2-nitrobenzenesulfonyl chloride was altered to 4-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ7.95 ppm (2H, d), 7.88 (2H, d), 7.70 (2H, br.s), 7.65 (2H, d), 7.60-7.50 (4H, m), 7.41 (1H, m), 7.30 (2H, d), 3.70 (2H, q), 2.56 (3H, s), 2.40

(3H, s), 1.00 (3H, t). λmax=392.5 nm, ε=23900 [l·mol$^{-1}$ cm$^{-1}$] and the half-value width=118.0 nm in methanol.

Synthesis Example 10

The azo compound (the foregoing exemplified compound (26)) of the invention was obtained in the same manner as in Synthesis Example 1 except that the compound (2) was altered to 4'-(N-ethylamino)-acetoanilide and 4-methoxy-2-nitrobenzenesulfonyl chloride was altered to 4-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ10.05 ppm (1H, s), 7.88 (2H, d), 7.70 (2H, br.s), 7.65-7.50 (8H, m), 7.43 (1H, m), 7.00 (2H, d), 3.58 (2H, q), 2.40 (3H, s), 2.05 (3H, s), 0.99 (3H, t). λmax=392.0 nm, ε=23700 [l·mol$^{-1}$ cm$^{-1}$] and the half-value width=114.0 nm in methanol.

Synthesis Example 11

The azo compound (the foregoing exemplified compound (27): bisazo compound) of the invention was obtained in the same manner as in Synthesis Example 1 except that the compound (2) was altered to 4,4'-diamino-2,2'-biphenyldisulfonic acid and 4-methoxy-2-nitrobenzenesulfonyl chloride was altered to 4-nitrobenzenesulfonyl chloride. Also, the structure of the azo compound was confirmed by NMR, and λmax, ε and half-value width of the azo compound were measured in the same manner as in Synthesis Example 1.

$^1$H-NMR (300 MHz, solvent: dimethyl-d6sulfoxide, standard material: tetramethylsilane) δ 10.18 ppm (2H, br.s), 8.40-6.40 (28H, br.m), 2.40 (6H, s). λmax=395.0 nm, ε=26700 [l·mol$^{-1}$ cm$^{-1}$] and the half-value width=138.0 nm in methanol.

<Colorant-containing Curable Composition of the Invention>

The invention will be explained in more detail by way of examples concerning the colorant-containing curable composition of the invention.

Example 1

1) Preparation of a Resist Solution

The following components were mixed to dissolve thereby preparing a resist solution.

(Resist Solution Composition)

| | |
|---|---|
| Propylene glycol monomethyl ether acetate (PGMEA) | 19.00 parts |
| Ethyl lactate | 36.00 parts |
| Cyclohexanone | 0.87 parts |
| Binder (allylmethacrylate/methacrylic acid) copolymer (molar ratio = 65:35) 41% PGMEA solution) | 30.51 parts |
| Dipentaerythritol hexacrylate | 12.20 parts |
| Polymerization inhibitor (p-methoxyphenol) | 0.0075 parts |
| Fluorine type surfactant (trade name: F-475, manufactured by Dainippon Ink and Chemicals, Incorporated) | 0.95 parts |
| 2-(O-benzoyloxim)-1-[4-(phenylthio)phenyl]-1,2-octanedione (Photoinitiator) | 0.600 parts |

2) Production of a Glass Substrate with an Undercoat Layer

A glass substrate (Coning 1737) was subjected to ultrasonic washing using an aqueous 1% NaOH, then washed with water and then subjected to dehydrating baking (200° C./30 minutes).

Then, the above resist solution 1) was applied to the washed glass substrate in a film thickness of 2 μm by a spin coater, dried under heating at 220° C. for one hour to form a hardened layer, thereby obtaining a glass substrate with an undercoat layer.

3) Preparation of a Colorant-containing Resist Solution 9.4 g of the resist solution obtained in the above 1) was mixed and dissolved in 0.6 g of the specific example (22) of the compound represented by the formula (I) to obtain a colorant-containing resist solution.

4) Exposure/Development of the Colorant-containing Resist (Image Formation)

The dye resist solution obtained in the above 3) was applied the undercoat layer of the glass substrate with an undercoat layer which was obtained in the above 2) in a film thickness of 1.0 μm by a spin coater and prebaked at 120° C. for 120 seconds.

Then, using an exposure apparatus, the coating layer was irradiated with light having a wavelength of 365 nm in an exposure amount of 800 mJ/cm$^2$ through a 20 μm thick mask. After the exposure was finished, the coating layer was developed using a developer (trade name: CD-2000, 60%, manufactured by Fuji Film Arch (K.K.)) in the condition of 260° C. and 60 seconds. Thereafter, the coating layer was rinsed in flowing water for 20 seconds, followed by spray-drying to form an image.

In this example, the formation of an image was confirmed by an optical microscope and by observation of a SEM photography according to an usual method.

Also, the "unexposed portion developing characteristics" and the "exposed portion residual film rate" were measured by a chromaticity meter (trade name: MCPD-1000, manufactured by Otsuka Electronics Co., Ltd.).

Also, the "unexposed portion developing characteristics" shows the rate of change in the absorbance of the layer before and after the developing. A larger value is better in the case of a negative type light-sensitive composition. Also, the "exposed portion residual film rate" indicates the retentive rate of the absorbance of the layer before and after the developing. A larger value is better in the case of a negative type light-sensitive composition.

That the unexposed portion developing characteristics and the exposed portion residual film rate both have larger values means that the pattern forming characteristics are good.

In this example, the "heat resistance" was evaluated in the following manner: a glass substrate to which the dye resist solution was applied was heated at 200° C. for one hour by a hot plate and then a change in chromaticity, namely, ΔEab value was measured by a chromaticity meter (trade name: MCPD-1000, manufactured by Otsuka Electronics Co., Ltd.). The smaller the ΔEab value is, the higher the heat resistance is.

Also, the "light-fastness" was evaluated as follows: a glass substrate to which the dye resist solution was applied was irradiated with light from a xenon lamp at an intensity of 200,000 lux for 10 hours (corresponding to 2,000,000 lux·h) and then a change in chromaticity, namely, ΔEab value was measured. The smaller the ΔEab value is, the higher the light-fastness is.

The molar extinction coefficient (ε) was calculated from the absorbance in methanol. As the chromatic value, the value ε/Mw obtained by dividing the molar extinction coefficient (ε) by Mw of the dye was used.

These results are shown in Table 1.

Examples 2 to 7

An image was formed in the same manner as in Example 1 except that the colorant was changed to the compound shown in Table 1 below in 3) Preparation of a colorant-containing resist solution in Example 1 and was evaluated in the same manner. The results are shown in Table 1 below.

Examples 8 to 14

An image was formed in the same manner as in Example 1 except that the glass substrate in each of Examples 1 to 7 was altered to a silicon wafer substrate. As to the unexposed portion developing characteristics and the exposed portion residual film rate, the same results as in Examples 1 to 7 were obtained.

Examples 8 to 14 used a silicon wafer substrate and therefore differed in substrate from Examples 1 to 7. However, since the colorant resist solution was applied to the undercoat layer in all of Examples 1 to 14, there was no substantial difference between Examples 1 to 7 and Examples 8 to 14 and the same performances were obtained in all of these examples.

Example 15

An image was formed in the same manner as in Example 1 except that the photoinitiator was altered to TAZ-107 (manufactured by Midori Kagaku Co., Ltd.) in the above 1) Preparation of a resist solution in Example 1 and evaluated in the same manner. The results are shown in Table 1.

Example 16

An image was formed in the same manner as in Example 1 except that the photoinitiator was altered to 2-benzyl-2-dimethylamino-4-morpholinobutyrophenone in the above 1) Preparation of a resist solution in Example 1 and evaluated in the same manner. The results are shown in Table 1.

Comparative Examples 1 and 2

An image was formed in the same manner as in Example 1 except that the colorant was altered to the following each dye (comparative compounds 1 and 2) in the above 3) Preparation of a colorant-containing resist solution in Example 1 and evaluated in the same manner. The results are shown in Table 1.

TABLE 1

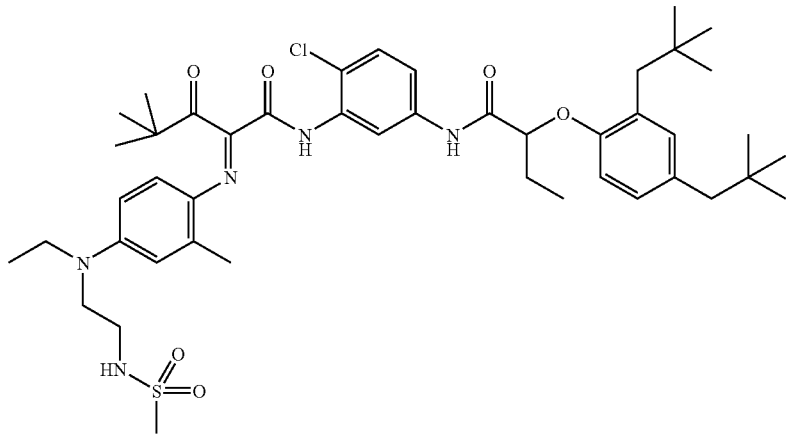

Comparative compound 1

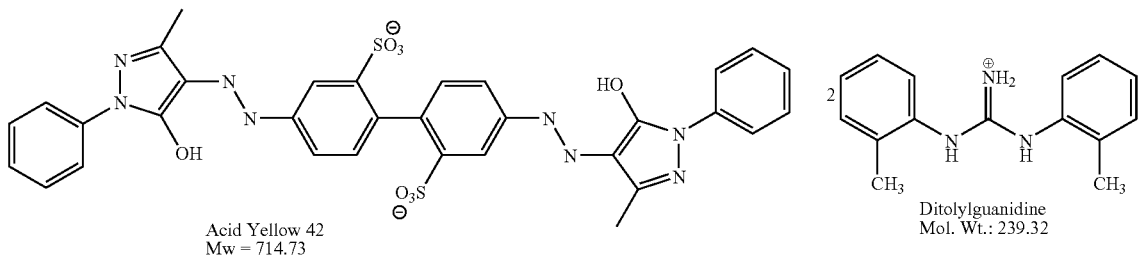

Comparative compound 2

| | Colorant | Unexposed portion developing characteristics | Exposed portion residual film rate | Heat resistance ΔEab (200° C./1 h) | Light-fastness ΔEab (2 M lux · h) | $\epsilon$ $(1 \cdot mol^{-1} cm^{-1})$ | $\epsilon$/Mw |
|---|---|---|---|---|---|---|---|
| Example 1 | Specific example (22) | 100 | 100 | 5.08 | 4.89 | 23900 | 49.7 |
| Example 2 | Specific example (2) | 100 | 100 | 1.81 | 3.40 | 17000 | 38.7 |
| Example 3 | Specific example (3) | 100 | 99 | 2.51 | 1.35 | 17000 | 36.2 |
| Example 4 | Specific example (4) | 100 | 100 | 2.81 | 3.20 | 15800 | 32.2 |
| Example 5 | Specific example (5) | 100 | 99 | 2.30 | 2.20 | 15500 | 33.6 |
| Example 6 | Specific example (23) | 100 | 99 | 3.60 | 3.10 | 16200 | 34.8 |
| Example 7 | Specific example (24) | 100 | 98 | 4.50 | 3.55 | 18500 | 40.8 |

TABLE 1-continued

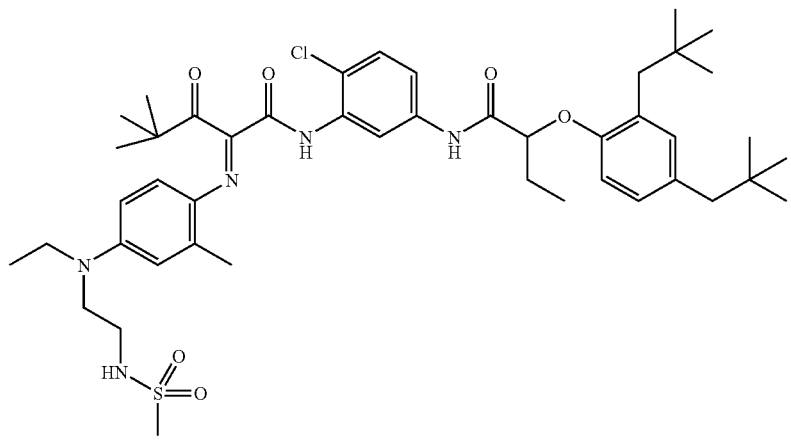

Comparative compound 1

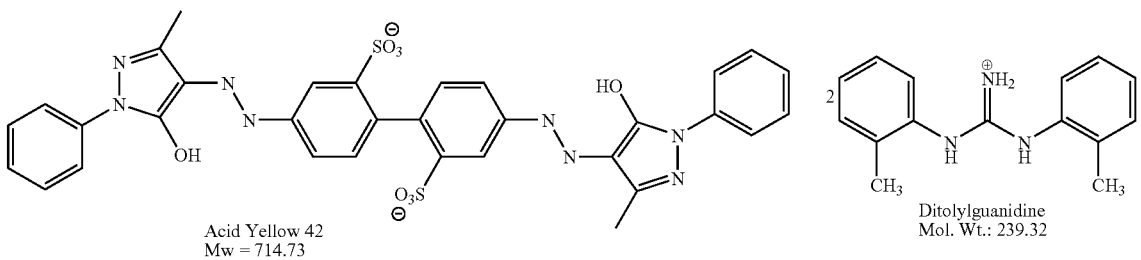

Acid Yellow 42
Mw = 714.73

Comparative compound 2

Ditolylguanidine
Mol. Wt.: 239.32

| | Colorant | Unexposed portion developing characteristics | Exposed portion residual film rate | Heat resistance ΔEab (200° C./1 h) | Light-fastness ΔEab (2 M lux · h) | ε (1 · mol$^{-1}$cm$^{-1}$) | ε/Mw |
|---|---|---|---|---|---|---|---|
| Example 15 | Specific example (22) | 100 | 99 | 5.60 | 5.10 | 23900 | 49.7 |
| Example 16 | Specific example (22) | 100 | 98 | 5.20 | 5.05 | 23900 | 49.7 |
| Comparative Example 1 | Comparative compound 1 | 100 | 68 | 36.80 | 28.60 | 16500 | 19.7 |
| Comparative Example 2 | Comparative compound 2 | 45 | 89 | 43.50 | 38.50 | 55300 | 46.3 |

Table 1 shows that it had been difficult to satisfy various abilities of Table 1 at the same time as shown in Comparative Examples. However, the use of the colorant-containing curable composition containing the compound represented by the formula (I) in the invention made it possible to obtain a curable composition exhibiting high performances as to the heat resistance, light-fastness and chromaticity of a colorant. Also, it was found that at the same time, the composition of the invention could improve the unexposed portion developing characteristics and also the exposed portion residual film rate, showing that the composition had good pattern-forming characteristics.

Particularly, the improvement in chromaticity can reduce the amount of the dye to be added and can improve various abilities of the resist.

It was also clarified that Comparative Example 1 using a conventional dye exhibited inferior performances as to the exposed portion residual film rate, heat resistance, light-fastness and chromaticity.

Also, Comparative Example 2 using a conventional pyrazolone-azo type dye exhibited significantly inferior performances as to the exposed portion residual film rate, heat resistance and light-fastness and the superiority of the azo compound (aminopyrazole dye) of the invention was thus clarified.

Example 17

An image was formed in the same manner as in Example 1 except that, in the above 3) Preparation of a colorant-containing resist solution in Example 1, a positive type color-light-sensitive resin composition A prepared in the following formulation was used in place of the colorant-containing resist solution and in the exposure, a low-pressure mercury lamp was used to irradiate the coating layer with lights having wavelengths of 245 nm and 185 nm respectively at a dose of 800 mJ/cm$^2$ through a 20 μm thick mask, and evaluated in the same manner. The results are shown in Table 2.

(Preparation of a Positive Type Color Light-sensitive Resin Composition A)

The following components were mixed and dissolved to obtain a positive type color light-sensitive resin composition A.

(Composition)

| | |
|---|---|
| Ethyl lactate | 75.0 parts |
| Binder shown below (P-1) | 14.0 parts |
| Specific Example (22) of the compound represented by the formula (I) | 6.0 parts |
| Photo-acid generating agent (PAG-1 shown below) | 4.0 parts |
| Fluorine type surfactant (trade name: F-475, manufactured by Dainippon Ink and Chemicals, Incorporated) | 0.4 parts |

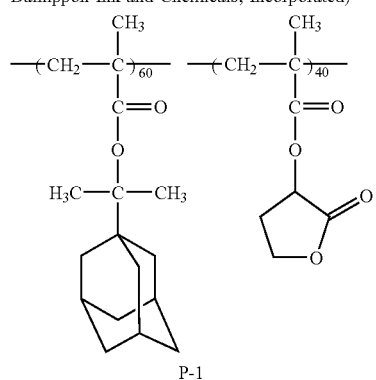

P-1

-continued

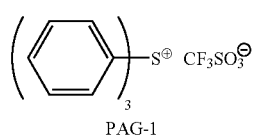

PAG-1

Example 18

An image was formed in the same manner as in Example 1 except that, in the above 3) Preparation of a colorant-containing resist solution of Example 1, a positive type color-light-sensitive resin composition B prepared in the following formulation was used in place of the colorant-containing resist solution, and evaluated in the same manner. The results are shown in Table 2.

(Preparation of a Positive Type Color Light-sensitive Resin Composition B)

| | |
|---|---|
| Ethyl lactate | 210.0 parts |
| Novolac resin (molecular weight based on polystyrene: 5500) obtained by condensation of p-cresol with formaldehyde | 20.0 parts |
| Hexamethoxymethylolmelamine | 15.0 parts |
| Specific Example (22) of the compound represented by the formula (I) | 35.0 parts |
| Ester of 2,3,4-trihydroxybenzophenone and o-naphthoquinonediazide-5-sulfonyl chloride (esterification rate: 80 mol %; quinonediazide compound) | 15.0 parts |
| Ester of [4-(7,8-dihydroxy-2,4,4-trimethyl-2-chromanyl)pyrogallol] and o-naphthoquinonediazide-5-sulfonic acid | 15.0 parts |

TABLE 2

| | Colorant | Unexposed portion developing characteristics | Exposed portion residual film rate | Heat resistance ΔEab (200° C./1 h) | Light-fastness ΔEab (2M lux · h) | ε (1 · mol - 1 cm-1) | ε/Mw |
|---|---|---|---|---|---|---|---|
| Example 17 | Specific example (22) | 0 | 0 | 6.32 | 5.63 | 23900 | 49.7 |
| Example 18 | Specific example (22) | 0 | 0 | 6.55 | 5.77 | 23900 | 49.7 |

As is found from Table 2, positive type curable compositions which are superior in the heat resistance, light-fastness and chromaticity of the colorant could be obtained also in Examples 17 and 18. It was found that Examples 17 and 18 were positive type light-sensitive compositions and therefore, each value of the unexposed portion developing characteristics and the exposed portion residual film rate is preferably small. Also, at the same time, the unexposed portion developing characteristics and the exposed portion residual film rate could be improved, showing that the composition had good pattern forming characteristics.

Examples 19 to 26

Images were formed in the same manner as in Example 1 except that, in the above 3) Preparation of a colorant-containing resist solution in Example 1, the colorant was altered to the compounds shown in Table 3 below, and evaluated in the same manner. The results are shown in Table 3.

TABLE 3

|  | Colorant | Unexposed portion developing characteristics | Exposed portion residual film rate | Heat resistance ΔEab (200° C./1 h) | Light-fastness ΔEab (2M lux · h) | ε (1 · mol - 1 cm-1) | ε/Mw |
|---|---|---|---|---|---|---|---|
| Example 19 | Specific example (25) | 100 | 100 | 4.65 | 3.00 | 23900 | 47.6 |
| Example 20 | Specific example (26) | 100 | 99 | 3.25 | 3.25 | 16600 | 35.9 |
| Example 21 | Specific example (29) | 100 | 100 | 3.55 | 3.30 | 23700 | 45.8 |
| Example 22 | Specific example (30) | 100 | 100 | 3.05 | 3.55 | 23600 | 48.2 |
| Example 23 | Specific example (31) | 100 | 100 | 2.05 | 2.25 | 26700 | 25.0 |
| Example 24 | Specific example (32) | 100 | 98 | 2.65 | 3.10 | 24000 | 48.9 |
| Example 25 | Specific example (33) | 100 | 97 | 2.30 | 3.15 | 23900 | 51.7 |
| Example 26 | Specific example (34) | 100 | 96 | 2.45 | 3.05 | 24000 | 48.9 |

As is found from Table 3, positive type curable compositions which are superior in the heat resistance, light-fastness and chromaticity of the colorant could be obtained also in Examples 19 to 26 by using the colorant-containing curable composition containing the compound represented by the formula (I). It was also found that each value of the unexposed portion developing characteristics and the exposed portion residual film rate could be improved, showing that the composition had good pattern forming characteristics.

The amount of the dye to be added can be decreased by improving, particularly, the chromaticity and therefore, various characteristics of a resist can be improved.

What is claimed is:

1. An azo compound represented by the following formula (I):

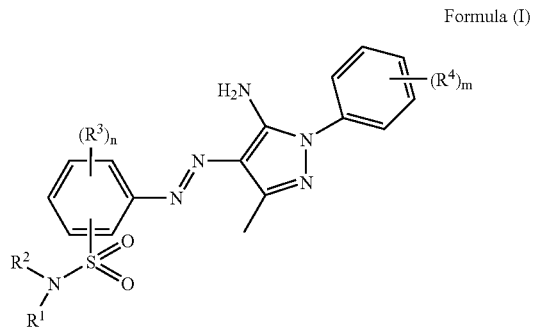

Formula (I)

wherein $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms and $R^1$ and $R^2$ may form a hetero ring with nitrogen atoms bonded therewith; $R^3$ represents a halogen atom, a trihalomethyl group, an alkoxy group having 1 to 21 carbon atoms or a nitro group; $R^4$ represents a halogen atom or a —$SO_3M$ group; M represents a metal atom cation or a cation comprising a nitrogen-containing compound; m denotes an integer from 0 to 5; and n denotes an integer from 0 to 4.

2. A colorant-containing curable composition comprising a colorant, wherein the colorant contains a compound represented by the following formula (I):

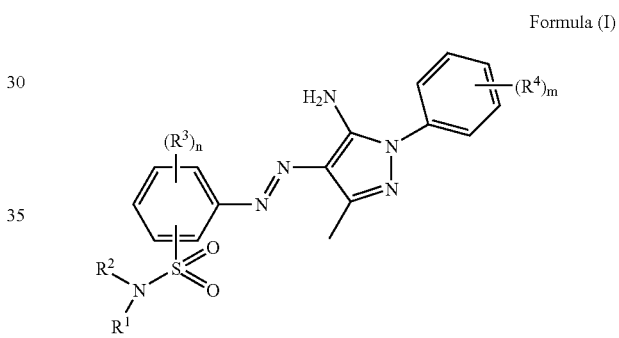

Formula (I)

wherein $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms and $R^1$ and $R^2$ may form a hetero ring with nitrogen atoms bonded therewith; $R^3$ represents a halogen atom, a trihalomethyl group, an alkoxy group having 1 to 21 carbon atoms or a nitro group; $R^4$ represents a halogen atom or a —$SO_3M$ group; M represents a metal atom cation or a cation comprising a nitrogen-containing compound; m denotes an integer from 0 to 5; and n denotes an integer from 0 to 4.

3. A colorant-containing curable composition according to claim 2, the composition further comprising a monomer.

4. A colorant-containing curable composition according to claim 3, wherein said monomer contains a (meth)acrylate type monomer.

5. A colorant-containing curable composition according to claim 3, wherein said monomer contains a (meth)acrylate type monomer that is at least tetra-functional.

6. A colorant-containing curable composition according to claim 2, the composition further comprising a binder.

7. A colorant-containing curable composition according to claim 6, wherein said binder comprises an alkali-soluble (meth)acryl type resin.

8. A colorant-containing curable composition according to claim 6, wherein said binder contains an alkali-soluble (meth)acryl type resin having a polymerizable side chain.

9. A colorant-containing curable composition according to claim 2, the composition further comprising a photoinitiator.

10. A colorant-containing curable composition according to claim 9, wherein said photoinitiator is at least one compound selected from the group consisting of a trihalomethyltriazine compound, a benzyldimethylketal compound, an α-hydroxyketone compound, an α-aminoketone compound, a phosphine oxide compound, a metallocene compound, an oxime compound, a triallylimidazole dimer, a benzothiazole compound, a benzophenone compound, an acetophenone compound and its derivative, a cyclopentadiene-benzene-iron complex and its salt, a halomethyloxadiazole compound, and a 3-aryl substituted cumarin compound.

11. A colorant-containing curable composition according to claim 9, wherein said photoinitiator contains at least one compound generating no acid by decomposition.

12. A colorant-containing curable composition according to claim 9, wherein said photoinitiator is at least one compound selected from the group consisting of an α-aminoketone compound, a phosphine oxide type compound, a metallocene compound, an oxime type compound and a triallylimidazole dimer.

13. A colorant-containing curable composition according to claim 2, the composition further comprising a crosslinking agent.

14. A positive type colorant-containing curable composition, the composition comprising a compound represented by the formula (I), a photosensitizer and a solvent.

15. A positive type colorant-containing curable composition according to claim 14, wherein said photosensitizer is an o-benzoquinonediazide sulfonate or an o-naphthoquinonediazide sulfonate.

16. A positive type colorant-containing curable composition according to claim 15, the composition further comprising a hardener.

17. A positive type colorant-containing curable composition, the composition comprising a compound represented by the formula (I), a photo-acid generating agent and a hardener.

18. A color filter comprising a compound represented by the following formula (I):

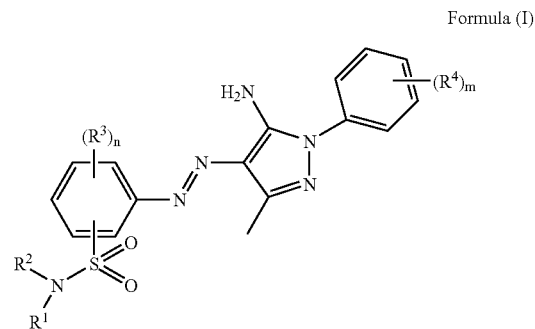

Formula (I)

wherein $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms and $R^1$ and $R^2$ may form a hetero ring with nitrogen atoms bonded therewith; $R^3$ represents a halogen atom, a trihalomethyl group, an alkoxy group having 1 to 21 carbon atoms or a nitro group; $R^4$ represents a halogen atom or a —$SO_3M$ group; M represents a metal atom cation or a cation comprising a nitrogen-containing compound; m denotes an integer from 0 to 5; and n denotes an integer from 0 to 4.

19. A color filter comprising the colorant-containing curable composition as claimed in claim 2.

20. A method of producing a color filter, the method comprising applying the colorant-containing curable composition as claimed in claim 2 to a support, then exposing the composition to light through a mask and developing the composition to form a pattern.

* * * * *